(12) United States Patent
Kimura et al.

(10) Patent No.: US 9,971,185 B2
(45) Date of Patent: May 15, 2018

(54) LIQUID CRYSTAL DISPLAY DEVICE, SUBSTRATE FOR LIQUID CRYSTAL DISPLAY DEVICE AND MANUFACTURING METHOD OF SUBSTRATE FOR LIQUID CRYSTAL DISPLAY DEVICE

(71) Applicant: Toppan Printing Co., Ltd., Taito-ku (JP)

(72) Inventors: Yukihiro Kimura, Taito-ku (JP); Kenzo Fukuyoshi, Taito-ku (JP)

(73) Assignee: TOPPAN PRINTING CO., LTD., Taito-ku (JP)

( * ) Notice: Subject to any disclaimer, the term of this patent is extended or adjusted under 35 U.S.C. 154(b) by 59 days.

(21) Appl. No.: 14/754,099

(22) Filed: Jun. 29, 2015

(65) Prior Publication Data
US 2015/0301400 A1 Oct. 22, 2015

Related U.S. Application Data

(63) Continuation of application No. PCT/JP2013/083624, filed on Dec. 16, 2013.

(30) Foreign Application Priority Data

Dec. 27, 2012 (JP) .................... 2012-286225

(51) Int. Cl.
G02F 1/1335 (2006.01)
H04N 13/00 (2018.01)
(Continued)

(52) U.S. Cl.
CPC ....... G02F 1/133512 (2013.01); G02B 27/22 (2013.01); G02F 1/13318 (2013.01);
(Continued)

(58) Field of Classification Search
CPC .......... G02F 1/13318; G02F 1/133345; G02F 1/133516; G02F 1/133602;
(Continued)

(56) References Cited

U.S. PATENT DOCUMENTS 6,118,584 A 9/2000 Van Berkel et al.
6,801,243 B1 10/2004 Van Berkel
(Continued)

FOREIGN PATENT DOCUMENTS

JP 02-032302 A 2/1990
JP 2000-321993 A 11/2000
(Continued)

OTHER PUBLICATIONS

U.S. Appl. No. 14/815,194, filed Jul. 31, 2015, Kimura, et al.
(Continued)

*Primary Examiner* — James Dudek
(74) *Attorney, Agent, or Firm* — Oblon, McClelland, Maier & Neustadt, L.L.P.

(57) ABSTRACT

A liquid crystal display device includes a counter substrate facing an array substrate via a liquid crystal layer, and a backlight unit provided on a back side of the array substrate. The counter substrate includes a first light shielding layer formed on a first transparent substrate, a transparent resin layer formed on the first transparent substrate, and a second light shielding layer formed on the transparent resin layer. The first light shielding layer has openings corresponding to polygonal pixels having a polygonal shape in which at least two edges are parallel in a planar view. The first light shielding layer includes a first linear pattern having a center line that overlaps with a center line of a second linear pattern of the second light shielding layer in a planar view. The first linear pattern has a line width different from a line width of the second linear pattern.

19 Claims, 25 Drawing Sheets

(51) Int. Cl.
*G02F 1/133* (2006.01)
*G02F 1/1333* (2006.01)
*G02F 1/1343* (2006.01)
G02B 27/22 (2018.01)
G02F 1/1368 (2006.01)
H04N 13/04 (2006.01)

(52) U.S. Cl.
CPC .... *G02F 1/13439* (2013.01); *G02F 1/133345* (2013.01); *G02F 1/133514* (2013.01); *G02F 1/133516* (2013.01); *G02F 1/133602* (2013.01); *G02F 1/134309* (2013.01); *H04N 13/00* (2013.01); G02B 27/2214 (2013.01); G02F 1/1368 (2013.01); G02F 1/13338 (2013.01); G02F 1/133615 (2013.01); G02F 2001/133623 (2013.01); G02F 2001/134318 (2013.01); G02F 2001/134345 (2013.01); G02F 2001/134381 (2013.01); H04N 13/04 (2013.01)

(58) Field of Classification Search
CPC ........... G02F 1/134309; G02F 1/13439; G02F 1/133514; G02F 1/133512; G02B 27/22; H04N 13/00
See application file for complete search history.

(56) References Cited

U.S. PATENT DOCUMENTS

| | | |
|---|---|---|
| 6,992,718 B1 | 1/2006 | Takahara |
| 2005/0073625 A1 | 4/2005 | Daiku et al. |
| 2005/0276071 A1 | 12/2005 | Sasagawa et al. |
| 2008/0246837 A1 | 10/2008 | Schultz et al. |
| 2009/0091667 A1 | 4/2009 | Schultz et al. |
| 2009/0091668 A1 | 4/2009 | Kristoffersen et al. |
| 2010/0225858 A1* | 9/2010 | Dong ................ G02F 1/133512 349/106 |
| 2011/0134347 A1 | 6/2011 | Brott et al. |
| 2012/0287359 A1 | 11/2012 | Yamazaki et al. |
| 2013/0083264 A1* | 4/2013 | Hagiwara ......... G02F 1/133707 349/42 |

FOREIGN PATENT DOCUMENTS

| | | |
|---|---|---|
| JP | 3930021 B2 | 6/2007 |
| JP | 4010564 B2 | 11/2007 |
| JP | 2008-164899 A | 7/2008 |
| JP | 4213226 B2 | 1/2009 |
| JP | 2009-069458 A | 4/2009 |
| JP | 2010-506214 A | 2/2010 |
| JP | 2010-524047 A | 7/2010 |
| JP | 2010-210982 A | 9/2010 |
| JP | 2010-541019 A | 12/2010 |
| JP | 2010-541020 A | 12/2010 |
| JP | 4655465 B2 | 3/2011 |
| JP | 2012-252325 A | 12/2012 |
| KR | 10-2005-0034850 A | 4/2005 |
| TW | 200910310 A | 3/2009 |
| WO | WO 2011/148706 A1 | 12/2011 |

OTHER PUBLICATIONS

U.S. Appl. No. 14/753,577, filed Jun. 29, 2015, Kimura, et al.
International Search Report dated Mar. 11, 2014 in PCT/JP2013/083624 filed Dec. 16, 2013.
Combined Office Action and Search Report dated Mar. 29, 2017 in Chinese Patent Application No. 201380063450.9 (with partial English translation and English translation of categories of cited documents).

* cited by examiner

LIQUID CRYSTAL DISPLAY DEVICE, SUBSTRATE FOR LIQUID CRYSTAL DISPLAY DEVICE AND MANUFACTURING METHOD OF SUBSTRATE FOR LIQUID CRYSTAL DISPLAY DEVICE

CROSS-REFERENCE TO RELATED APPLICATIONS

The present application is a continuation application of International Application No. PCT/JP2013/083624, filed Dec. 16, 2013, which is based upon and claims the benefit of priority to Japanese Patent Application No. 2012-286225, filed Dec. 27, 2012. The entire contents of these applications are incorporated herein by reference.

BACKGROUND OF THE INVENTION

Field of the Invention

The present invention relates to a liquid crystal display device capable of displaying two dimensional displays or three dimensional (stereo image) displays, a substrate for a liquid crystal display device and a manufacturing method of the substrate for a liquid crystal display device.

Discussion of the Background

A liquid crystal panel included in a general liquid crystal display has a configuration in which a liquid crystal layer is sandwiched by two substrates. The two substrates include, for example, a transparent substrate such as glass. A polarizing plate, or a polarizing plate and a phase difference plate are disposed on the front side and the back side of the liquid crystal display.

A liquid crystal display device capable of displaying three dimensional displays or capable of controlling a viewing angle emits light by using a backlight unit or an external light source. The liquid crystal display device capable of displaying three dimensional displays or capable of controlling viewing angle controls, based on a purpose of the display, an angle of the light emitted from the front surface of the liquid crystal panel towards an observer side (external side).

In a liquid crystal display device or a display apparatus capable of displaying three dimensional displays, various display methods are employed. The three dimensional display includes, for example, methods using glasses and methods not using glasses. Methods using glasses include, for example, an anaglyph method in which color differences are utilized or a polarized glasses method in which polarization is utilized. In methods using glasses, the observer is required to wear dedicated glasses, which causes discomfort to the observer. Therefore, in recent years, for three dimensional displays, methods not using glasses have been more popular.

To adjust the angle of the emitted light from the liquid crystal display to a single observer (hereinafter may be referred to as a stereoscopic type) or to a plurality of observers (hereinafter may be referred to a multi-eye type), a technique in which an optical control element is disposed on the front surface or the back surface of the liquid crystal display panel has been considered. In the liquid crystal display device where a method not using glasses is applied, the optical control element may be used.

As an example of the optical element, optical lenses are arranged two dimensionally, and lenticular lenses that accomplish regular refraction are used. The lenticular lens may be formed by processing a transparent resin to be in a sheet shape. In this case, the lenticular lens is employed while attached to the front surface or the back surface of the liquid crystal display device.

The patent literature 1 (Japanese Patent Number 4010564), and patent literature 2 (Japanese Patent Number 4213226) disclose a three dimensional display technique by using a lenticular lens or a lenticular screen. In the patent literature 1, a display element (pixel or sub pixel) is formed in a parallelogram shape or a triangular shape, or a display element is arranged with offset to substantially produce an angle between an arrangement of pixels or sub pixels and a lenticular lens or a lenticular screen. In the patent literature 1, similar to patent literature 2, there is a continuous (smooth) horizontal parallax to the observer. However, in patent literature 1, by a pixel arrangement in which pixels are arranged substantially in oblique and an edge of the lenticular screen that intersects this pixel arrangement, irregularities may occur on the display.

The patent literatures 3 to 8 (Japanese Patent Application Laid-Open Publication No. 2010-506214, Japanese Patent Application Laid-Open Publication No. 2010-524047, Japanese Patent Application Laid-Open Publication No. 2010-541019, Japanese Patent Application Laid-Open Publication No. 2010-541020, Japanese Patent No. 4655465 and Japanese Patent No. 3930021) disclose a prism sheet provided with a convex lens.

Patent literature 9 (Japanese Patent Application Laid-Open Publication No. 2010-210982) discloses a parallax barrier for three dimensional display to the naked-eye. In paragraphs [0016] and [0060] of patent literature 9, it is disclosed that necessary intervals for three dimensional display are secured between the parallax barrier and a color barrier by a configuration in which a light transmission film is formed between the parallax barrier and the color barrier.

Patent literature 9 discloses that the parallax barrier is conductive, however, having an aperture ratio increase is not disclosed because of a relationship between a black matrix being usually formed at the color filter and this parallax barrier. For example, in FIG. 9 of the patent literature 9, the parallax barrier is formed at a location where a part of pixels (B, G, R) are overlapped and the transmittance is likely to decrease. In addition, in FIG. 10 which is considered as a pixel cross section of patent literature 9, a black matrix 41 is illustrated. Since the parallax barrier is formed to cross a color filter 6, it is considered that the transmittance may be decreased. According to the configuration of the parallax barrier described in the patent literature 9, since the parallax barrier is electrically conductive, it is difficult to implement in-cell type electro capacitive touch sensing.

The parallax barrier which is explained in patent literature 9 should be conductive as a necessary requirement. As described in the paragraphs [0025] and [0054] of the patent literature 9, the parallax barrier is formed by using a metal thin film such as chrome or aluminum. According to a film forming method of the parallax barrier in the patent literature 9, it is considered that high manufacturing cost will be required. Further, in a manufacturing method for forming the black matrix 41 having light shielding properties, how to perform the alignment thereof is not examined. Usually, a black matrix contains color material having light shielding properties such as carbon pigment with high density and similarly, the parallax barrier may have light shielding properties. Thus, in a case where the black matrix and the parallax barrier have the light shielding properties, performing a photo alignment may be difficult.

Patent literature 1: Japanese Patent Number 4010564
Patent literature 2: Japanese Patent Number 4213226

Patent literature 3: Japanese Patent Application Laid-Open Publication Number 2010-506214
Patent literature 4: Japanese Patent Application Laid-Open Publication Number 2010-524047
Patent literature 5: Japanese Patent Application Laid-Open Publication Number 2010-541019
Patent literature 6: Japanese Patent Application Laid-Open Publication Number 2010-541020
Patent literature 7: Japanese Patent Number 4655465
Patent literature 8: Japanese Patent Number 3930021
Patent literature 9: Japanese Patent Application Laid-Open Publication Number 2010-210982

SUMMARY OF THE INVENTION

According to one aspect of the present invention, a liquid crystal display device includes an array substrate, a liquid crystal layer, a counter substrate facing the array substrate via the liquid crystal layer, and a backlight unit provided on a back side of the array substrate opposite to a side where the liquid crystal layer is formed. The array substrate has polygonal pixels including side edge portions and has two pixel electrodes in a polygonal pixel positioned to have line symmetry with respect to a pixel center line that divides the polygonal pixels in a longitudinal direction. The counter substrate includes a first transparent substrate, a first light shielding layer formed on the first transparent substrate, a transparent resin layer formed on the first transparent substrate, and a second light shielding layer formed on the transparent resin layer. The first light shielding layer has an openings formed in the side edge portions and corresponding to the polygonal pixels having a polygonal shape in which at least two edges thereof are parallel in a planar view. The first light shielding layer includes a first linear pattern having a center line in a direction along which the first linear pattern is extended. The second light shielding layer includes a second linear pattern having a center line in a direction along which the second linear pattern is extended. The first and second linear patterns are formed such that the center line of the first linear pattern overlaps with the center line of the second linear pattern in the side edge portions in a planar view, and that the first linear pattern has a line width different from a line width of the second linear pattern.

According to another aspect of the present invention, a substrate for a liquid crystal display device includes a transparent substrate, a first light shielding layer formed on the transparent substrate and having openings corresponding to polygonal pixels in a planar view, a transparent resin layer formed on the transparent substrate on which the first light shielding layer is formed, and a second light shielding layer formed on the transparent resin layer. The polygonal pixels each have a polygonal shape in which at least two edges thereof are parallel in a planar view. The first light shielding layer includes carbon pigment as a principal component of light shielding color material. The second light shielding layer includes at least one organic pigment as a principal component of light shielding color material. The first light shielding layer includes a first linear pattern having a center line in a direction along which the first linear pattern is extended, the second light shielding layer includes a second linear pattern having a center line in a direction along which the second linear pattern is extended, and the first and second linear patterns are formed such that the center line of the first linear pattern overlaps with the center line of the second linear pattern in a planar view, and that the first linear pattern has a line width different from a line width of the second linear pattern.

According to still another aspect of the present invention, a method of manufacturing a liquid crystal display substrate includes forming, on a transparent substrate, at least one alignment mark and a first light shielding layer having openings corresponding to polygonal pixels in a planar view, the forming comprising coating a first black resist on the transparent substrate and exposing the first black resist via a photomask, forming a color filter including a red filter, a blue filter and a green filter in the openings; forming a transparent resin layer on the color filter, coating a second black resist on the transparent resin layer, detecting a position of the alignment mark by infrared light, aligning a position of a photomask and a position of the transparent substrate based on the position of the alignment mark, and forming an organic pigment light shielding layer. The first black resist includes carbon pigment as a principal component of light shielding color material, and the second black resist includes an organic pigment as a principal component of light shielding color material and includes C.I. Pigment Violet 23.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

With reference to the drawings, hereinafter will be described embodiments of the present invention. In the following explanations, regarding functions and elements which are identical or substantially identical, the same reference numbers are applied and explained as necessary.

In the respective embodiments, only a portion having distinct feature is described and explanation for portions which are not different from a regular liquid crystal display device is omitted.

In the respective embodiments, a case is described where the unit of display in the liquid crystal display device is a single pixel (or picture element). However, the unit for display may be one sub pixel or other than that, a plurality of pixels (number of pixels) may constitute the unit of display. Further, pixels defined arbitrarily may constitute the unit of display. It is assumed that the pixel is a polygon having at least two parallel edges.

In a planar view, a horizontal direction of the pixel is defined to be parallel to a direction along which the right eye and the left eye of the observer are located.

In a planar view, a direction perpendicular to the horizontal direction of the pixel is defined as the longitudinal direction of the pixel.

The longitudinal direction is sometimes referred to as the pixel long side direction. The horizontal direction is sometimes referred to as the pixel short side direction.

In the respective embodiments, various liquid crystal drive methods may be used. For example, a liquid crystal alignment method such as the IPS method (horizontal electric field method using liquid crystal molecules with horizontal alignment), VA (Vertically Alignment: vertical electric field method using liquid crystal molecules with vertical alignment), HAN (Hybrid-aligned Nematic), OCB (Optically Compensated Bend), CPA (Continuous Pinwheel Alignment), or a liquid crystal drive method may be used. A liquid crystal layer may include liquid crystal molecules having a positive dielectric anisotropy or liquid crystal molecules having a negative dielectric anisotropy.

A rotational direction (operational direction) of the liquid crystal molecules when liquid crystal drive voltage is applied may be a direction parallel to the surface of the substrate or a direction perpendicular to a plane of the substrate. A direction along which liquid crystal drive voltage is applied to the liquid crystal molecules may be a horizontal direction or a two or three dimensional oblique direction or a vertical direction.

First Embodiment

In the present embodiment, the pixel has a long side along the longitudinal direction.

Figure 1:
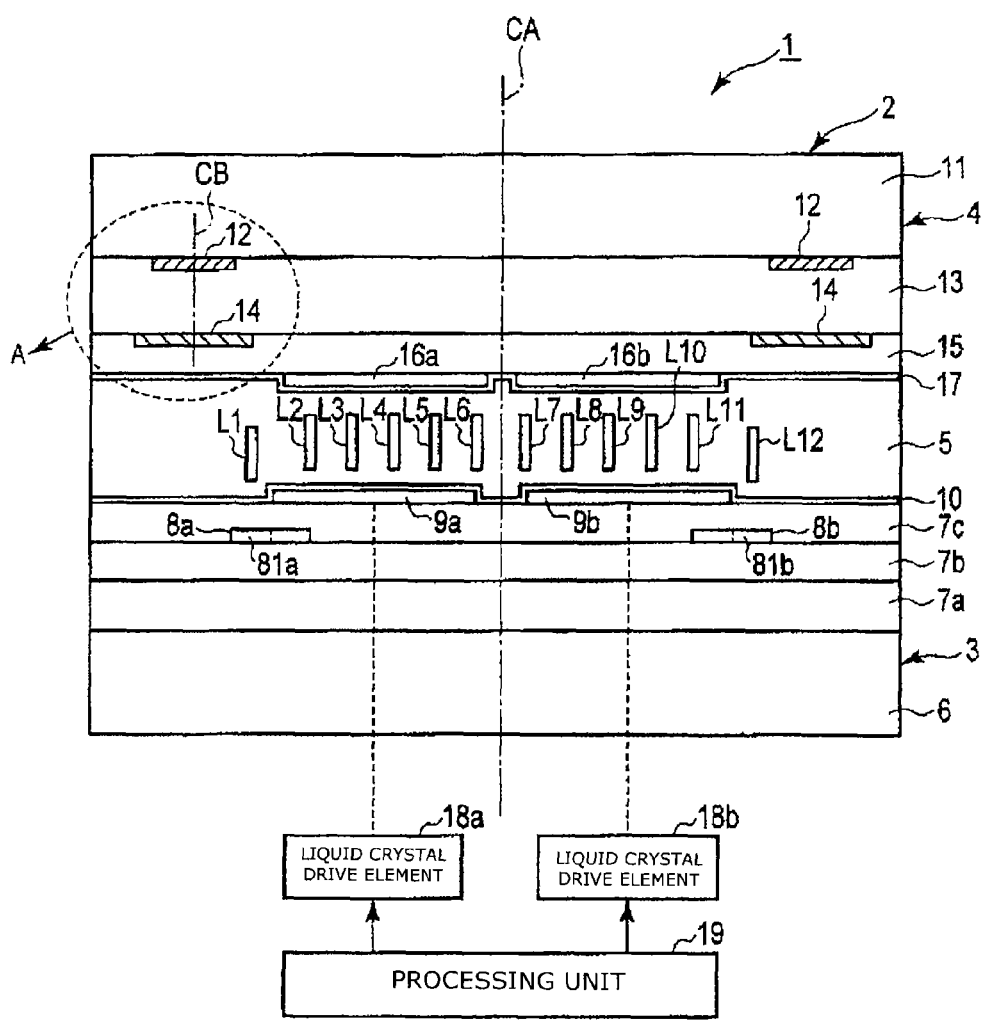
FIG. 1 is a partial cross sectional view showing an example of a configuration of a liquid crystal panel provided in a liquid crystal display device according to the first embodiment.

FIG. 1 is a partial cross sectional view showing an example of a configuration of a liquid crystal panel 2 provided in the liquid crystal display device 1 according to the present embodiment. FIG. 1 is a cross sectional view in the horizontal direction of a pixel of the liquid crystal display panel 2. In FIG. 1, a pixel having a long side along the longitudinal direction represents a pixel having a longitudinal direction in a direction perpendicular with respect to the plane of the paper. FIG. 1 illustrates an example of a state where the liquid crystal drive voltage is not applied. In the liquid crystal panel 2, a polarizing plate and a phase difference plate or the like are omitted.

Figure 2:
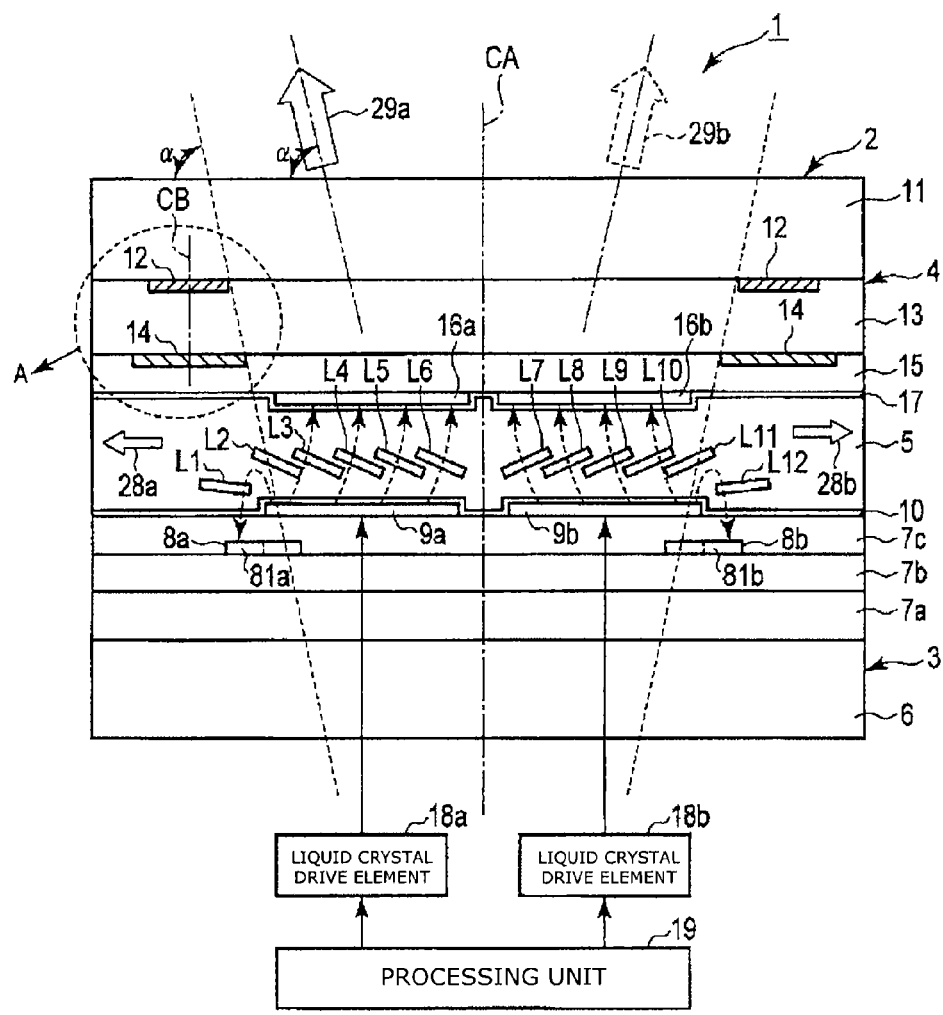
FIG. 2 is a partial cross sectional view showing an example of a state where a liquid crystal drive voltage is applied to a liquid crystal panel according to the first embodiment.

FIG. 2 is a partial cross sectional view of showing an example of a state of the liquid crystal panel 2 when the liquid crystal drive voltage is supplied.

In the present embodiment, a case is described where the liquid crystal drive voltage is applied to liquid crystal molecules having a negative dielectric anisotropy, a vertical alignment in an initial state and an oblique electric field.

The liquid crystal panel 2 according to the present embodiment is provided with an array substrate 3, a liquid crystal display device substrate (hereinafter referred to as counter substrate) 4 and a liquid crystal layer 5.

The array substrate 3 and the counter substrate 4 face each other. A liquid crystal layer 5 is sandwiched between the array substrate 3 and the counter substrate 4.

The array substrate 3 is provided with a transparent substrate 6 (second transparent substrate), insulation layers 7a to 7c, common electrodes 8a and 8b, pixel electrodes 9a and 9b and an alignment film 10.

As a transparent substrate 6, for example, a glass plate is used.

The insulation layers 7a to 7c are formed on a first surface of the transparent substrate 6. The common electrodes 8a and 8b are formed on the insulation layer 7b. The insulation layer 7c is formed on the insulation layer 7b on which the common electrodes 8a and 8b are formed. The pixel electrodes 9a and 9b are formed on the insulation layer 7c. The alignment film 10 is formed directly or indirectly on the insulation layer 7.

As insulation layers 7a to 7c, for example, SiN is employed.

The pattern of the pixel electrode 9a and 9b may be, for example, a comb-like pattern, a band-shape, a line-shape or a stripe shape pattern.

The common electrodes 8a and 8b face the pixel electrodes 9a and 9b respectively in a direction perpendicular to a substrate-plane via the insulation layer 7c, and are offset in the horizontal direction from each other. The pattern of the common electrodes 8a and 8b may be, for example, a comb-like pattern, a belt-shape, a line-shape or a stripe shape pattern.

The pixel electrode 9 and the common electrode 8 may contain conductive metal oxide. As a conductive metal oxide, for example, a transparent conductive film such as indium-tin-oxide (ITO) is used. The pixel electrode 9 is driven by a thin film transistor (hereinafter may be referred to as a liquid crystal drive element). For the thin film transistor, a transistor using poly silicon semiconductor or a thin film transistor provided with a channel layer containing two or more metal oxides from among gallium, indium, zinc, tin, hafnium and yttrium may be used. As a material of the channel layer which is formed by an oxide semiconductor, amorphous or crystalline material can be used. However, taking stability of electrical characteristics of the transistor (for example, Vth) into consideration, a crystallized channel layer is preferably used. The thickness of the oxide semiconductor can be selected from, for example, 2 nm to 80 nm.

A metal wiring of the array substrate provided with a transistor that uses oxide semiconductor as a channel layer can be constituted by metal wirings having at least two layers. In these metal wirings having two layers, a wiring at which the surface layer is located is formed by a copper or copper alloy. Regarding the metal wirings, copper alloy to which one or more element selected from among magnesium, titanium, nickel, molybdenum, indium, tin, zinc, aluminum, calcium and beryllium is added can be employed. The element added to the copper is not limited to the above-described materials. However, an amount of addition added to the copper is preferably equal to or less than 3 atomic percentage with respect to the atomic percentage of the copper.

It is noted that the surface layer of the metal wiring represents a metal layer (first metal layer) located at the liquid crystal layer side (position close to the liquid crystal layer, optical sensor side) when viewing the array substrate as a cross section sectioned across the thickness direction. The metal layer (second metal layer) located at a lower portion with respect to copper or copper alloy in the surface layer is located at an array substrate side.

In the second metal layer, high melting metal such as titanium, molybdenum, tantalum and tungsten or an alloy containing the above-described metal can preferably be used. The copper of the first metal layer or copper alloy and titanium alloy having similar etching rate can be selected as a second metal layer. The thickness of the copper or copper alloy and the thickness of the second metal layer is preferably set within a range from 50 nm to 500 nm.

Regarding the transistor provided with a channel layer made of oxide semiconductor, for example, a transistor having for example a bottom gate structure or double gate structure or dual gate structure can be employed. The transistor provided with a channel layer made of oxide semiconductor can be formed as a drive element of a liquid crystal or a drive element of optical sensors.

A film forming method for an oxide semiconductor layer, the first metal layer having copper or copper alloy as a surface layer, and the second metal layer, is not limited to any specific method, however, considering productivity, vacuum film forming by using sputtering may preferably be used. By using a sputtering film forming apparatus, a metal wiring including the first metal layer and the second metal layer can be film-formed on a large-area transparent substrate effectively with high throughput. By using a wet etching method in which each of copper or copper alloy and oxide semiconductor layer are selectively etched, a copper or copper alloy pattern and an oxide semiconductor pattern can be formed. It is not necessary to use costly apparatus such as a dry etching machine. From a view point of cost reduction, it is suitable because the consistency between the copper or copper alloy and the oxide semiconductor in the manufacturing process is extremely high. Since the copper or copper alloy has excellent conductivity, wiring resistance can be reduced so that low power consumption of the liquid crystal and high drive speed of the liquid crystal can be accomplished.

The liquid crystal molecules L1 to L12 of the liquid crystal layer 5 are driven by a liquid crystal drive voltage applied between the pixel electrode 9 and the common electrode 8. The long axis of the liquid crystal molecules L1 to L12 inclines from about vertical direction to about horizontal direction.

The second surface of the transparent substrate 6 included in the array substrate 3 is located inside the liquid crystal display device 1 and located at the back surface side of the liquid crystal panel 2. The alignment film 10 included in the array substrate 3 is located at the liquid crystal layer side.

The counter substrate 4 is provided with a transparent substrate 11 (first transparent substrate), a carbon pigment light shielding layer 12 as an example of the first light shielding layer, a first transparent resin layer 13, an organic pigment light shielding layer 14 as an example of the second light shielding layer, a second transparent resin layer 15, a counter electrode 16a and 16b and an alignment film 17. According to the embodiment, at least either carbon pigment light shielding layer 12 or an organic pigment light shielding layer 14 is used as a black matrix. The carbon pigment light shielding layer 12 and the organic pigment light shielding layer 14 form a plurality of openings that correspond to a plurality of polygonal pixels.

As a transparent substrate 11, for example, a glass plate is employed.

The carbon pigment light shielding layer 12 including carbon pigment as a principal component (main constituent, main agent or major ingredient) of a light shielding color material is formed on the first surface of the transparent substrate 11. The first transparent resin layer 13 is formed on the first surface of the transparent substrate 11 upon which the carbon pigment light shielding layer 12 is formed. The organic pigment light shielding layer 14 including an organic pigment as a principal component of a light shielding color material is formed on the first transparent resin layer 13. The second transparent resin layer 15 is formed on the first transparent resin layer 13 in which the organic pigment light shielding layer 14 is formed. The counter electrodes 16a and 16b are formed on the second transparent resin layer 15. The alignment film 17 is formed directly or indirectly on the second transparent resin layer 15 in which counter electrodes 15a and 15b are formed.

The carbon pigment light shielding layer 12 includes carbon pigment as a principal component. The carbon light shielding 12 may include, as long as it is not the principal component, other light shielding color material instead of carbon pigment.

The carbon pigment light shielding layer 12 may be arranged in a periphery of an outer effective display region which is called as a frame and may be used as an alignment marks of the color filter.

The organic pigment light shielding layer 14 includes organic pigment as a principal component of the light shielding color material. The organic pigment light shielding layer 14 may include, as long as it is not the principal component, another light shielding color material which is not an organic pigment.

The composition of the pigment included in the organic pigment light shielding layer 14 can be adjusted such that for a mass ratio with respect to the whole organic pigment, a purple organic pigment ranges from 30 to 70%, a yellow organic pigment ranges from 25 to 50% and a red organic pigment ranges from 0 to 40%.

In the respective embodiment, the principal component of the light shielding color material is defined as, in mass ratio, a pigment having mass exceeding 50% with respect to mass of whole pigment of the light shielding color material. That is, in the carbon pigment light shielding layer 12, the mass of carbon pigment is defined as a mass exceeding 50% of the mass of the whole pigment. In the organic pigment light shielding layer 14, the mass of organic pigment is defined as mass exceeding 50% of mass of the whole pigment.

For example, each of the thickness of the first transparent resin layer 13 and the thickness of the second transparent resin layer 15 may be in a range from 0.5 µm to 4 µm.

In the present embodiment, a thickness (distance) exists between the carbon pigment light shielding layer 12 and the organic pigment light shielding layer 14 in order to allow the emitting light to obliquely travel with respect to the pixel center line CA. The organic pigment light shielding layer 14 becomes a light shielding layer close to the liquid crystal layer 5, which is closer than the carbon pigment light shielding layer 12. According to a liquid crystal drive method such as FFS or IPS, in which the liquid crystal molecule revolves horizontally on the substrate plane, since the organic pigment light shielding layer 14 is close to the liquid crystal layer 5, the following advantages can be obtained. According to an FFS or IPS driving method to drive the liquid crystal, a propagation distance of the liquid crystal molecules in the revolving operation is longer when a drive voltage is applied to the liquid crystal layer 5 and the drive voltage (electric field) influences adjacent pixels to which liquid crystal drive voltage is not applied. Hence, the light may leak at the edge portion of the adjacent pixel. In the precise pattern, due to this light leakage, display quality may be degraded. However, according to the present embodiment, by providing the organic pigment light shielding layer 14 close to the liquid crystal layer 5, the occurrence of light leaking in an oblique direction from an edge portion of the adjacent pixel can be significantly reduced.

The second transparent resin layer 13 planarizes the counter substrate 4 and further serves as a protection cover for the counter substrate 4.

The counter electrodes 16a and 16b are for example, a transparent conductive film such as ITO and may be a conductive metal oxide. As patterns of the counter electrodes 16a and 16b may be, for example, a comb-like pattern, a band-shape, a line-shape or a stripe shape pattern.

The second surface of the transparent substrate 11 included in the counter substrate 4 is located at a display surface of the liquid crystal display device 1 and at an observer side.

The alignment films 10 and 17 may provide the liquid crystal molecules L1 to L12 with approximately 90 degrees of vertical alignment (corresponds to pre-tilt angle in the following description) with respect to the substrate plane. The alignment films 10 and 17 may provide the liquid crystal molecules L1 to L12 with a pre-tilt angle to have line symmetry with respect to the pixel center line CA. The pre-tilt angle is, for example, an inclination of the liquid crystal molecules L1 to L2 that incline from a direction perpendicular to the substrate plane when the liquid crystal drive voltage is not applied. That is, the pre-tilt angle is an angle of the long axis of the liquid crystal molecules with respect to the normal direction of the substrate surface, when the liquid crystal drive voltage is not applied.

To set the pre-tilt angle, for example, alignment films 10 and 17 having photosensitivity are formed on each of the array substrate 3 and the counter substrate 4 and the array substrate 3 and the counter substrate 4 are attached to each other with the liquid crystal layer 5 sandwiched therebetween. Subsequently, voltage is applied between the pixel electrode 9a and 9b and the common electrodes 8a and 8b and between the pixel electrode 9a and 9b and the counter electrodes 16a and 16b, then exposure is performed by using radiation such as ultraviolet light, thereby performing alignment processing. The pre-tilt angle may be set by a physical method such as rubbing.

The liquid crystal layer 5 includes liquid crystal molecules L1 to L12 having negative dielectric anisotropy. The liquid crystal molecules L1 to L12 align under a condition in which the liquid crystal drive voltage is not applied, as an initial alignment, to be approximately perpendicular to respective substrate surfaces of the array substrate 3 and the counter substrate 4. However, the liquid crystal layer 5 may include liquid crystal molecules having positive dielectric anisotropy. The liquid crystal molecules L1 to L12 are driven based on an oblique electric field.

The common electrodes 8a and 8b face the pixel electrodes 9a and 9b in a direction perpendicular to the substrate plane via the insulation layer 7c.

The counter electrodes 16a and 16b face the pixel electrode 9a and 9b in a direction perpendicular to the substrate plane via the alignment film 17, the liquid crystal layer 5 and the alignment film 10.

The counter electrodes 16a and 16b and the common electrodes 8a and 8b may be set, for example, to a common potential (e.g., ground potential).

In a cross sections as shown in FIG. 1 and FIG. 2, the counter electrodes 16a and 16b, the pixel electrodes 9a and 9b and the common electrodes 8a and 8b are arranged to have line symmetry with respect to the pixel center line CA.

The counter electrodes 16a and 16b and pixel electrodes 9a and 9b are arranged to be in a line symmetry with respect to the pixel center line CA and a location of the counter electrode 16a and a location of the pixel electrode 9a have an offset and a location of the counter electrode 16b and a location of the pixel electrode 9b have an offset. Thus, in a horizontal direction, by offsetting the locations between the counter electrodes 16a, 16b and the pixel electrodes 9a, 9b, an oblique electric field can be produced between the counter electrodes 16a, 16b and the pixel electrodes 9a, 9b. By this oblique electric field, liquid crystal molecules L1 to L12 of a vertical alignment tilts, with line symmetry (opposite directions depending on the right side or left side of the pixel), towards a direction 28a and 28b extending from the pixel center line CA to the edge portion (location at which the carbon pigment light shielding layer 13 and the organic pigment light shielding layer 14 are formed) of the pixel.

By setting the pre-tilt angle θ, the threshold voltage Vth at which the liquid crystal molecules L1 to L12 starts to tilt can be lowered. Even when the pre-tilt angle is not set in the vertical alignment, due to the oblique electric field, the liquid crystal molecules L1 to L12 can be tilted, with line symmetry (opposite directions depending on the right side or left side of the pixel), towards a direction 28a and 28b extending from the pixel center line CA to the edge portion of the pixel.

It is noted that counter electrodes 16a and 16b of the counter substrate 4 may be a whole surface formed film in which the counter electrodes 16a and 16b are formed on the whole surface of the second transparent resin layer 15 without pattern processing.

The array substrate 3 may be provided with the pixel electrodes 9a and 9b for every pixel. The locations between the pixel electrodes 9a, 9b and the common electrodes 8a, 8b have an offset in the horizontal direction. Specifically, the common electrodes 8a and 8b have portions 81a and 81b being protruded, in line symmetry with respect to the pixel center line CA, from the pixel electrodes 9a and 9b towards a direction extending from the pixel center line CA to the edge portion of the pixel. In other words, in a planar view, the common electrodes 8a and 8b are protruded towards outside the side edge of the polygonal pixel from the pixel electrodes 9a and 9b.

When the liquid crystal drive voltage is applied between the pixel electrodes 9a and 9b and the common electrodes 8a and 8b, a substantially strong electric field is produced between the pixel electrodes 9a and 9b and the common electrodes 8a and 8b and then, liquid crystal molecules L1 and L2 located in the vicinity of the protruded portions 81a and 81b of the common electrodes 8a and 8b rapidly tilt.

The liquid crystal drive elements 18a and 18b are electrically connected to different electrodes 9a and 9b respectively.

In different liquid crystal drive elements 18a and 18b, an image signal for the right eye and an image signal for the left eye of the observer are respectively provided, whereby three dimensional displaying can be performed. Each of the image signal for the right eye and the image signal for the left eye may be divided into a projecting image signal and a background image signal having depth.

The processing unit 19 performs a control capable of individually switching the liquid crystal drive element 18a and 18b.

According to the present embodiment, the carbon pigment light shielding layer 12 and the organic pigment light shielding layer 14 are overlapped at a side edge portion A in the vertical direction of the substrate plane.

Figure 3:
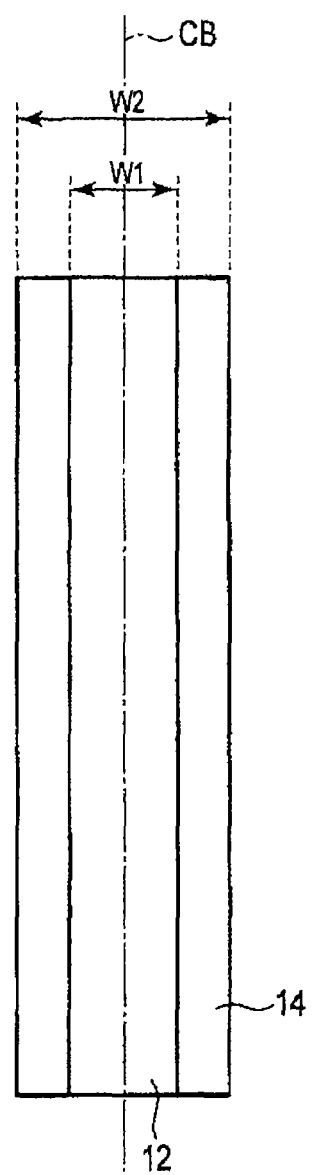
FIG. 3 is a partial planar view showing an example of a side edge portion of a pixel at which a carbon pigment light shielding layer and an organic pigment light shielding layer are overlapped.

FIG. 3 is a partial planar view showing an example of the side edge portion A of a pixel at which a carbon pigment light shielding layer 12 and an organic pigment light shielding layer 14 are overlapped. FIG. 3 is a planar view of the counter substrate 4 when viewing from the display surface of the display panel 2.

The polygonal pixels according to the present embodiment have at least two sides that are parallel in a planar view.

A linear pattern of the carbon pigment light shielding layer 12 and a linear pattern of the organic pigment lights shielding layer 14 are at least partly overlapped when viewing in planar view. The linear pattern of the carbon pigment light shielding layer 12 and the linear pattern of the organic pigment light shielding layer 14 have identical center axis CB (a center line extended in a direction where the linear pattern extends) and are overlapped to be parallel. The linear pattern of the carbon pigment light shielding layer 12 and the linear pattern of the organic pigment light shielding layer 14 correspond to two edges of the polygonal pixel. It is noted that the center axis CB represents a straight line passing through respective center locations in the line width of the linear pattern of the carbon pigment light shielding layer and in the line width of the organic pigment light shielding layer.

The line width W1 of the carbon pigment light shielding layer 12 and the line width W2 of the organic pigment light shielding layer 14 at the pixel sides A are different from each other.

In a planar view, the carbon pigment light shielding layers 12 arranged at both edges of the pixel face each other in the horizontal direction (a direction along which the right eye and the left eye of the observer are located).

Similarly, in a planar view, the organic pigment light shielding layers 14 face each other in the horizontal direction.

The carbon pigment light shielding layer 12 and the organic pigment light shielding layer 14 form two edges of the polygonal pixel.

The difference between the line width W1 of the carbon pigment light shielding layer 12 and the line width W2 of the organic pigment light shielding layer 14 is adjusted, in response to the size of the pixel, within a range from about 0.5 µm to 10 µm. In a case where the liquid crystal display device 1 is used as a mobile device by one observer, the difference between W1 and W2 may be within a small range, e.g., approximately 0.5 µm to 2 µm.

As shown in FIG. 2, the difference between W1 and W2 gives an emitting angle α (an angle of the emitting light with respect to the substrate plane) to the visible light 29a and 29b (emitting light) emitted from the liquid crystal panel 2 and supplements a three dimensional display effect. The emitting lights 29a and 29b having the emitting angle α are separated into the right eye and the left eye of the observer to be observed thereby. To achieve three dimensional display, a portion at which a line width difference between W1 and W2 is provided, may be only two edges of the light shielding layer which is parallel to the direction along which the right eye and the left eye of the observer reside.

Figure 4:
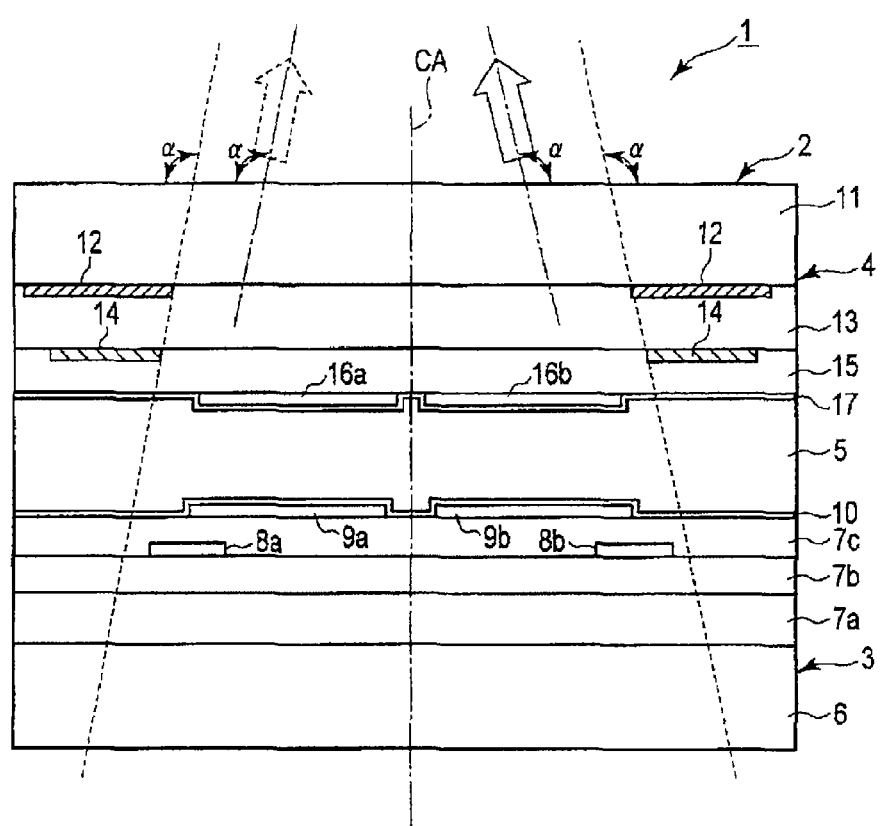
FIG. 4 is a partial cross sectional view showing an example of a light emitting state when a pattern width of a carbon pigment light shielding layer of the liquid crystal panel is larger than a pattern width of an organic pigment light shielding layer.

FIG. 4 is a partial cross sectional view showing an example of a light emitting state when a pattern width W1 of the carbon pigment light shielding layer 12 of the liquid crystal panel 2 is larger than a pattern width W2 of the organic pigment light shielding layer 14.

Hereinafter will be described a case where the line width W1 of the carbon pigment light shielding layer 12 is larger than the line width W2 of the organic pigment light shielding layer 14. In the edge portion of the organic pigment light shielding layer 14 and the edge portion of the carbon pigment light shielding layer 12 located at right side in FIG. 4, the light emitting direction is inclined by the emitting angle α with respect to the substrate plane and the emitting light is emitted outside from the liquid crystal display device 1. Similarly, in the edge portion of the organic pigment light shielding layer 14 and the edge portion of the carbon pigment light shielding layer 12 located at left side in FIG. 4, the light emitting direction is inclined by the emitting angle α with respect to the substrate plane and the emitting light is emitted outside from the liquid crystal display device 1. That is, the emitting light of the pixel is inclined towards the pixel center line CA such that an extended line of the emitting light and an extended line of the pixel center line CA are intersected to each other (not shown). The difference between the line width W1 of the carbon pigment light shielding layer 12 and the line width W2 of the organic pigment light shielding layer 14 influences the emitting angle α. Therefore, by adjusting the line width W1 of the carbon pigment light shielding layer 12 and the line width of W2 the organic pigment light shielding layer 14, the effects of the three dimensional display in the liquid crystal display device 1 can be enhanced.

Figure 5A:
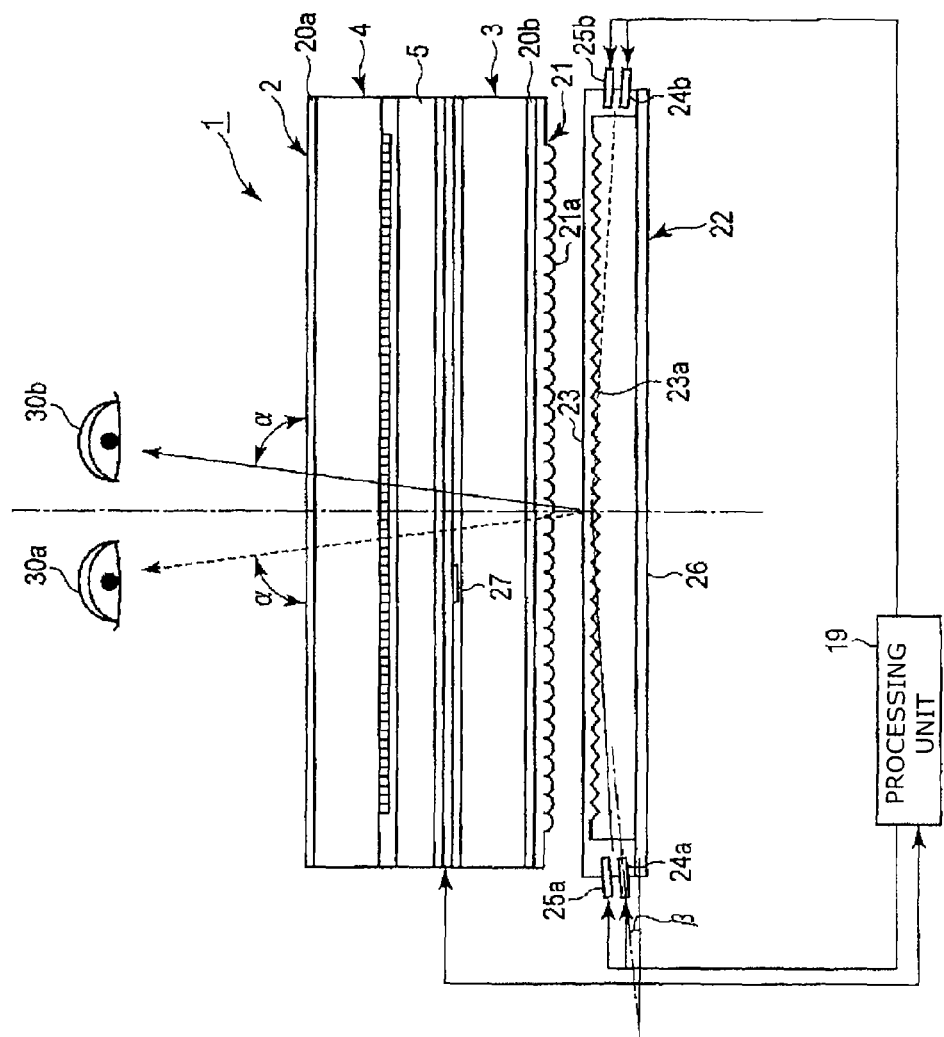
FIG. 5A is a cross sectional view showing an example of a liquid crystal display device according to the first embodiment.

FIG. 5A is a cross sectional view showing an example of the liquid crystal display device 1 according to the present embodiment. FIG. 5A is a cross sectional view in the horizontal direction of the liquid crystal display device 1.

The liquid crystal display device 1 is provide with a liquid crystal display panel 2, polarizing plates 20a and 20b, an optical control element 21 and a backlight unit 22. According to the present embodiment, a case is described where the liquid crystal display device includes, for example, the optical control element 21 and the backlight unit 22 in the liquid crystal display panel 2. It is noted that the liquid crystal panel 2 itself is sometimes called a liquid crystal display unit 1.

The polarizing plate 20a is provided on the front surface of the liquid crystal panel 2 (second surface side of the transparent substrate 11).

The polarizing plate 20b is provided on the back surface of the liquid crystal panel 2 (second surface of the transparent substrate 6).

The polarizing plates 20a and 20b may be formed by attaching a plurality of phase difference plates to each other. According to the present embodiment, a pair of polarizing plates 20a and 20b may be formed as a crossed Nicol configuration. For example, absorption axes of a pair of polarizing plates 20a and 20b orthogonally cross with each other. The liquid crystal display device 1 may include a helical shaped element at a portion between a first polarizing plate which is either the polarizing plate 20a or the polarizing plate 20b and the liquid crystal panel 2. The helical shaped element converts first linearly polarized light of the first polarizing plate into second linearly polarized light that orthogonally intersects the first linearly polarized light.

The optical control element 21 includes an array of semicircular lenses 21a. The optical control element 21 is disposed at a portion between the polarizing plate 20b and the backlight unit 22.

The backlight unit 22 is disposed in the liquid crystal panel 2 at a back surface side (opposite side of the observer) of the liquid crystal panel 2 via the polarizing plate 20b and the optical control element 21. The backlight unit 22 is disposed at an opposite side of the portion at which the liquid crystal layer 5 of the array substrate 3 is arranged. The backlight unit 22 may include, for example, a diffusion plate, an optical guide plate, a polarization separation film, a retroreflective polarizing element and the like, however, these components are omitted in FIG. 5A.

The backlight unit 22 is provided with an angle control units 50a and 51a, an optical control element 23, a solid light emitting elements 24a, 24b, 25a and 25b, and a reflection plate 26.

Figure 5B:
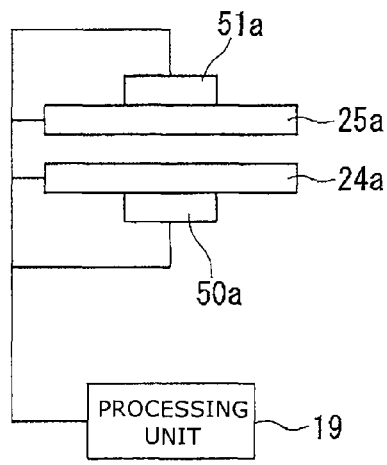
FIG. 5B is an enlarged cross sectional view showing a structure of an angle control unit disposed in the liquid crystal display device as shown in FIG. 5A.

FIG. 5B is an enlarged cross sectional view showing a structure of the angle control units 50a and 51a. The angle control units 50a and 51a control the emitting angle β of the emitting light emitted from the backlight unit 22. The emitting angle of the light emitted from the backlight unit 22 is adjusted by the angle control unit 50a and 51a, for example, based on a distance between both eyes of the observer and the display surface. The angle control unit 50a and 51a is configured by, for example, a drive apparatus having excellent controllability such as a piezoelectric element. By driving of the drive apparatus, the emitting angle β of the solid emitting elements 24a, 24b, 25a and 25b is adjusted and controlled. In other words, the angle control units 50a and 51a serves as a fine adjustment mechanism that controls an inclination of the solid emitting elements 24a and 25a with respect to a plane direction of the backlight unit 22. Also, as shown in FIG. 5B, the angle control unit 50a and 51a are connected to the processing unit 19. The processing unit 19 controls operation of the angle control units 50a and 51a. The angle control units 50a and 51a operate whereby the emitting angle β of emitting light is slightly adjusted and the angle α of the emitting light emitted from the display surface is adjusted, thereby contributing to producing an optimum three dimensional display effect. Further, as shown in FIG. 5A, solid emitting elements 24b and 25b are disposed at the edge portion opposite to the edge portion of the backlight unit 22 at which the solid emitting elements 24a and 25a are provided. The structure of the solid emitting elements 24b and 25b is the same as the solid emitting elements 24a and 25a. The solid emitting elements 24b and 25b adjust the emitting angle β of the emitting light emitted from opposite side of the solid emitting elements 24a and 25a. FIG. 5B illustrates a structure in which the angle control units are provided for both solid emitting elements 24a and 25a. However, without providing an angle control unit at the solid emitting element 25a, an angle control unit may be disposed at the solid emitting element 24a that emits visible light.

The optical control element 23 includes an array of the triangular prism 23a.

A plurality of solid emitting elements 24a and 24b (first solid emitting element) emit visible light.

A plurality of solid emitting elements 25a and 25b (second emitting element) emit infrared light or ultraviolet light.

The solid emitting elements 24a and 24b may be constituted by, for example, a white LED that emits white light including three wavelengths, i.e., red, green and blue in the light emission wavelength band. The solid emitting elements 24a and 24b may be constituted by, for example, a pseudo white LED in which a GaN blue LED and YAG fluorescent substances are combined. To enhance color rendering properties, a LED having one or more color major peaks such as a red LED may be used together with the pseudo white LED.

The plurality of solid emitting elements 24a and 24b may include LEDs that individually emit any one of color of light from among red, green and blue. For example, the processing unit 19 allows a red LED, a green LED and a blue LED to emit light in a time division manner (field sequential) and controls emission of light by the red LED, green LED and blue LED and a drive of the pixel in the liquid crystal display device 1 to be synchronized to each other. This will enable full color display.

Invisible light such as infrared light or ultraviolet light which is emitted by the plurality of solid emitting elements 25a and 25b is used as, for example, illumination light to a pointer such as a finger on the liquid crystal display screen. The liquid crystal display device includes, for example, optical sensors (light receiving elements) 27. The liquid crystal display device enables touch sensing by detecting reflected light from the pointer and is able to detect the position and movement of the pointer. As optical sensors 27, for example, image sensors such as CMOS or CCD sensors can be employed.

The solid emitting element 25a and 25b may be formed by coating a fluorescent substance for the infrared light conversion onto the blue LED or the purple LED, The solid emitting element 25a and 25b may be constituted by a semiconductor laser that emits infrared light. The solid emitting element 25a and 25b may be constituted by, for example, an infrared emitting LED such as GaAsP, GaAlAs, AlGaLnP. The solid emitting elements 25a and 25b may be provided, for example, at an edge portion, a side portion or corner portion of the backlight unit 22 when viewing in a planar view. The solid emitting elements 25a and 25b may be arranged with the solid emitting elements 24a and 24b such as red LED, green LED and blue LED in the same row or arranged alternately. In the backlight unit 22, each of the solid emitting elements 24a and 24b and the solid emitting elements 25a and 25b may be arranged in a line shape.

Figure 6:
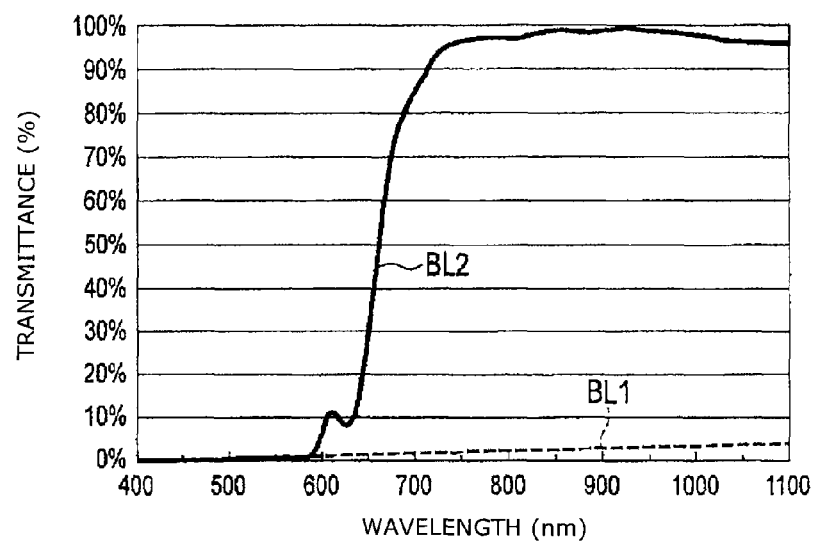
FIG. 6 is a graph showing an example of a relationship between a transmittance and a wavelength of a carbon pigment light shielding layer and an organic pigment light shielding layer according to the first embodiment.

FIG. 6 is a graph showing an example of a relationship between a transmittance and a wavelength of the carbon pigment light shielding layer 12 and the organic pigment light shielding layer 14.

In the transmittance characteristics BL1 of the carbon pigment light shielding layer, the transmittance is low with a light wavelength in the visible range and also low with a light wavelength not in the visible range such as long wavelengths longer than approximately 700 nm. The transmittance characteristics BL1 of the carbon pigment light shielding layer can be obtained easily by a resin dispersion coating film that contains carbon pigment as a principal component of the light shielding color material. The carbon pigment light shielding layer 12 may further contain a minute amount of organic pigment in order to adjust reflected color or to enhance the light shielding property.

The transmittance characteristics BL2 of the organic pigment light shielding layer may preferably be maintained to be low at low wavelength and may preferably have high transmittance in a region of light wavelength longer than approximately 680 nm or longer than approximately 800 nm. A high transmittance for light wavelength longer than 680 nm in the transmittance characteristics BL2 of the organic pigment light shielding layer can be obtained easily by dispersing a plurality of organic pigments in the resin coating film. The organic pigment light shielding layer 14 may further contain minute amount of carbon pigment in order to adjust reflected color or to enhance light shielding property. The half value (50%) of the transmittance in the organic pigment light shielding layer 14 corresponds to an approximate light wavelength of 670 nm. According to the present embodiment, at a long wavelength side which is longer than 680 nm, wavelength corresponding to the transmittance exceeding 50% (wavelength at 50% transmittance) is called a half-value wavelength.

In the present embodiment, alignment marks are formed together with the carbon pigment light shielding layer 12 and then, the organic pigment light shielding layer 14 is formed. A light shielding color material used for the organic pigment light shielding layer 14 has high transmittance at a longer wavelength side which is longer than a light wavelength of approximately 680 nm. Therefore, when the organic pigment light shielding layer 14 is formed, the alignment marks located under the light shielding color material used for the organic pigment light shielding layer 14 can be recognized using infrared light.

Figure 7:
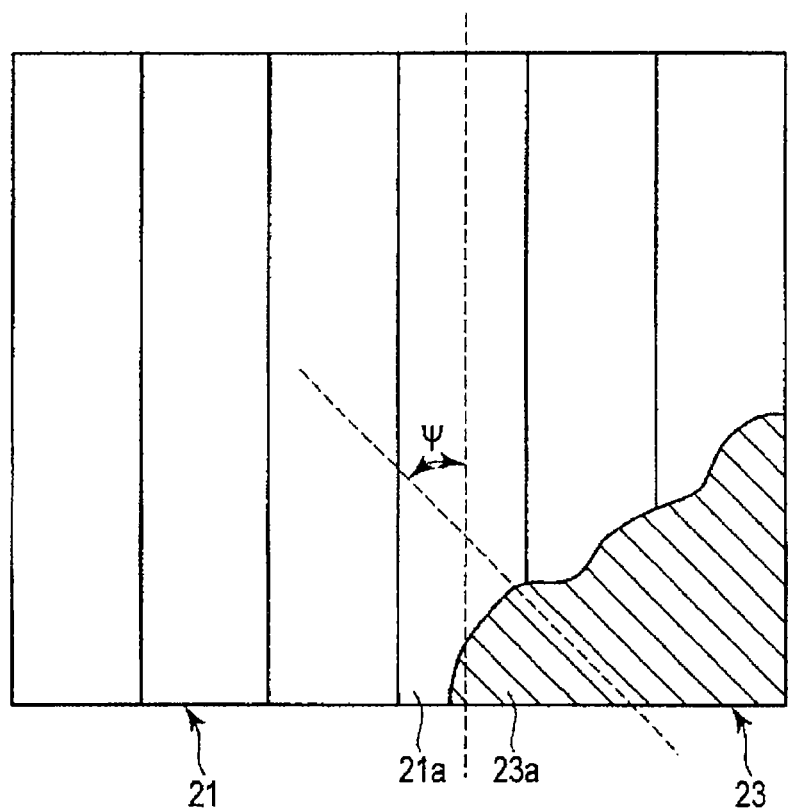
FIG. 7 is a planar view showing an example of a configuration of an optical control element according to the first embodiment.

FIG. 7 is a planar view showing an example of a configuration of the optical control elements 21 and 23 according to the present embodiment. A part of FIG. 7 is shown as a cross sectional view.

The axes of longitudinal direction of a plurality of semicircular lens 21a are parallel. The axes of the plurality of semicircular lens 21a are perpendicular to the short direction of the pixel and parallel to the longitudinal direction of the pixel.

The axes in the longitudinal direction of a plurality of triangular prisms 23a are parallel. The axes of the plurality of triangular prisms have an angle φ to the axis of the plurality of semicircular lens 21a, in a planar view. For example, the angle φ may be within a range from 3 degrees to 42 degrees. The angle φ may be larger than this range. The angle φ has an angle being not influenced by the polarizing plates 20a and 20b or an optical axis of the liquid crystal alignment.

The array of the semicircular lens 21a and the array of the triangular prism 23a may be formed integrally.

A pitch of the plurality of triangular prisms 23a may have a 1:1 relationship with a pitch of the plurality of semicircular lens. The pitch of the plurality of triangular prisms 23a may be more precise than the pitch of the plurality of semicircular lens 21a.

According to the present embodiment, illumination light which is visible light or invisible light is reflected at the retinas in both eyes of the observer. The optical sensors 27 detect this reflected light. The processing unit 19 generates positional information of the observer based on the detection data of the optical sensors 27. The processing unit 19 adjusts the emitting angle β of the emitting light of the solid emitting elements 24a and 24b based on the positional information of the observer and adjusts the emitting angle α of the emitting light 29a and 29b with respect to the display surface in accordance with both eye positions of the observer. The emitting angle α of the emitting light 29a and 29b may be adjusted by ½ apex angle ∈ of the triangular prism 23a. However, since the ½ apex angle cannot be adjusted variably, it is necessary to set the apex angle in advance for a specific purpose. When both eyes of the observer who is an adult are located at a location separated by approximately 30 cm from the display surface, the emitting angle α of the emitting light emitted from the display surface is set within a range from 6 degrees to 8 degrees, whereby visibility of the three dimensional display image can be improved. When the liquid crystal display device 1 is used for a plurality of observers, the above-described emitting angle α of the emitting light may be extended.

Figure 20:
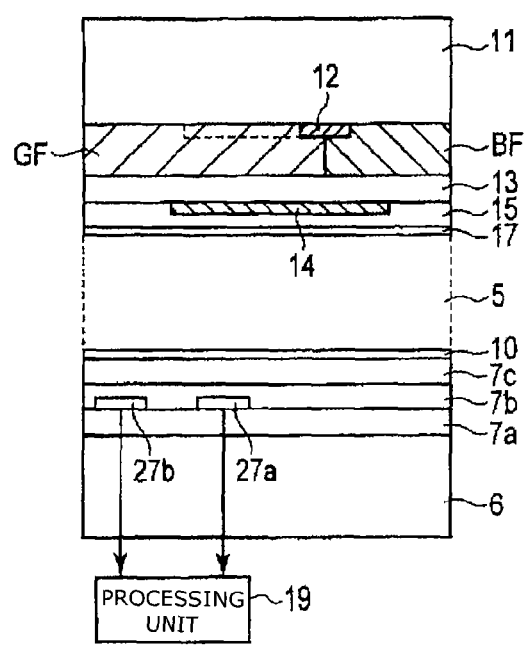
FIG. 20 is a partial cross sectional view showing a first example of a cross section in the horizontal direction at a portion in which a pattern of the carbon pigment light shielding layer is not formed.

The liquid crystal display device 1 is provided with the optical sensors 27 on the array substrate 3. As shown in FIG. 5A or FIG. 20, the optical sensors 27 receives incident light from outside or receives light reflected by the subject based on the light emitted from the backlight display unit 22. In FIG. 5A, schematically, one optical sensor 27 is illustrated, however, a plurality of optical sensors 27 are disposed on the array substrate 3. For example, a pair of optical sensors, i.e., two optical sensors for single pixel may be provided. The processing unit 19 performs a single process concerning color separation or touch sensing based on the detection data of the optical sensors 27. For example, the optical sensors 27 detect light having a specific wavelength emitted from the solid emitting elements 25a and 25b such as ultraviolet region or infrared region light emitting LEDs. The liquid crystal display device 1 may be utilized as a copying apparatus in which light emitted from the backlight unit 22 is irradiated to printed matter mounted on the liquid crystal display surface and reflected light is received.

The processing unit 19 performs signal processing on reception data of the respective optical sensors 27. For example, the processing unit 19 detects, based on the reception data detected by the optical sensors 27 which are arranged in a matrix, the position of the observer or the position of a pointer such as a finger. The optical sensors 27 may be an oxide semiconductor device in which a channel layer is formed by composite metal oxide. Moreover, the processing unit 19 may be configured to be capable of detecting infrared light or ultraviolet light.

When using light sensitive semiconductor device for the optical sensors, it is preferable to adjust the bandgap thereof so as to set the sensitive region of the optical sensors to be in the desired wavelength region. In SiGe semiconductor devices, by adjusting an addition ratio of Ge, the bandgap can be continuously changed and reception wavelength of the light reception element can be adjusted so that sensitivity of the infrared region can be applied. Moreover, SeGe semiconductor devices having concentration gradients of Ge can be accomplished. For example, by using a compound semiconductor such as GaAs, InGaAs, PbS, PbSe, SiGe or SiGeC, an optical sensor suitable for detecting infrared light can be formed. When using transistors having metal oxide channel layers such as IGZO (registered trade mark), or ITZO (registered trade mark) for the optical sensors (photo transistors), it is preferable to perform doping on the channel layer so as to obtain sensitivity in the visible light region and the infrared light region.

As optical sensors 27 used for optical isolation in a broad band, a silicon photo diode is selected. As a structure of the silicon photo diode, a pin or pn structure can be employed. In the silicon photo diode, the incident direction of the light is desired to have incidence through the P-type semiconductor surface. However, the incident direction of the light may be incident through the n-type semiconductor surface as necessary. The p-type semiconductor film may be formed by plasma CVD using a semiconductor material gas containing boron (B). The n-type semiconductor film may be formed by plasma CVD using a semiconductor material gas containing phosphorus (P). The i-type semiconductor film may be formed by plasma CVD using a semiconductor material gas not containing these impurities. These semiconductor films may be amorphous silicon or polysilicon or semi-amorphous.

The optical sensors 27 configured by these silicon semiconductors is capable of switching by a thin film transistor in which the channel layer is formed by metal oxide. Alternatively, the optical sensors 27 configured by these silicon semiconductors are capable of being switched by a thin film transistor of amorphous silicon or poly silicon. The film properties from the amorphous silicon to the polysilicon may be a silicon that continuously changes. For example, when the thin film transistor is provided with a channel layer containing two or more metal oxides from among gallium, indium, zinc, tin, hafnium, yttrium and germanium, this thin film transistor has high electron mobility and low leak current. Therefore, this thin film transistor (oxide semiconductor) is capable of high speed response which is necessary for three dimensional displays and capable of switching with low power consumption. The oxide semiconductor transistor is desirable as a high speed liquid crystal drive element which is necessary for three dimensional displays or high resolution two dimensional displays. Moreover, when the optical sensors 27 are switched by a high speed thin film transistor provided with a channel layer containing composite metal oxide, an intensity distribution of light detected by the optical sensors 27 can be converted to an electrical signal with less fluctuation and high reproducibility. As described above, since the oxide semiconductor transistor has high electron mobility, using the oxide semiconductor transistor has an advantage in detecting reception data of the optical sensors. In addition, using copper wiring (described later) further enhances the advantage. It should be noted that the switching of the optical sensors 27 represents selection/reading of the optical sensors 27 by the thin film transistor or a reset of the optical sensors 27 by the thin film transistor. In the present embodiment, the thin film transistor may be used as an element for an amplifier circuit by connecting the output wiring of the optical sensors 27 to the source electrode or the drain electrode of the thin film transistor.

The channel layer formed by a composite metal oxide containing two or more or three or more metal oxides has an amorphous state after film formation. After the channel layer is formed or the pattern of the channel layer is formed, an annealing is performed within a range from 250 degrees C. to 500 degrees C. so as to produce the composite metal oxide which is channel layer crystallized, whereby respective electrical properties of the transistors can be stabilized or homogenized. The annealing using laser light is performed to some of a plurality of transistors (channel layer), whereby transistors having different electrical characteristics such as threshold voltage Vth can be formed on the same substrate.

The condition of the annealing for the metal oxide is preferably in a high temperature range which is approximately from 400 degrees C. to 600 degrees C. However, considering heat-resistance properties of the source electrode, the drain electrode or, for example, metal wirings such as gate wiring, or an auxiliary capacity line, these define the substantial upper temperature limit. As a structure of the above-described metal wiring, for example, a copper wiring structure having a two layer configuration i.e., copper or copper alloy which have heat resisting properties higher than aluminum and high melting metals (e.g., titanium or titanium alloy) is employed, whereby the temperature of the annealing can be in the high temperature range, for example, approximately from 400 degrees C. to 600 degrees C. Since copper has conductivity higher than that of the aluminum, it is desirable to use copper considering the required high speed operation of the transistor for three dimensional displays. When the metal wiring is copper wiring, a transistor structure having a bottom gate structure in which a semiconductor layer (channel layer of the above-described oxide semiconductor) is formed on the gate electrode via an insulation layer can be employed. Regarding the metal wiring of which the surface layer is copper, the surface layer of the metal wiring close to the liquid crystal layer can be copper or copper alloy. When copper contains 3% or more dissimilar metal or impurities, the reflectance and the conductivity significantly decrease. Therefore, the metal containing copper as a base material may contain less than 3% of dissimilar metal or impurities, which is not influenced by a decline of the reflectance. In other words, a part of the configuration of the metal wiring can be copper or copper alloy containing less than 3 of dissimilar metal or impurities. As a dissimilar metal which can be added to copper, for example, there are magnesium, aluminum, indium and tin. The optical sensors can be formed on a layer of copper or copper alloy having high reflectance via an insulation layer.

In the present embodiment, for example, a frame region which is an outer periphery of the effective display region of the liquid crystal panel 2 may have a two layer configuration in which the carbon pigment light shielding layer 12 and the organic pigment light shielding layer 14 are overlapped. Thus, light shielding properties at the frame region can be enhanced.

In the present embodiment, for example, various liquid crystal alignment methods or liquid crystal drive methods such as the IPS method (horizontal electric field method using liquid crystal molecules of horizontal alignment), VA (vertically alignment: vertical electric field method using liquid crystal molecules of vertical alignment), HAN (Hybrid-aligned Nematic), TN (Twisted Nematic), OCB (Optically Compensated Bend), CPA (Continuous Pinwheel Alignment) or ECB (Electrically Controlled Birefringence) are employed. The liquid crystal material has a negative dielectric anisotropy or a positive dielectric anisotropy.

In the touch sensing of the liquid crystal display device 1, for example, near infrared light is emitted from solid emitting elements 25a and 25b that emit near infrared radiation of which light wavelength ranges 700 nm to 1100 nm. This near infrared light is emitted from the back light unit 22 via the surface of the liquid crystal panel 2 to light a pointer such as finger. The re-reflected light from the pointer is received by the optical sensor 27b, thereby allowing a touch sensing operation. The timing of the touch sensing and the timing of the emission timing of the near infrared light may preferably be synchronized by a processing unit 19. However, for example, when using near infrared light having light wavelength longer than 750 nm so that it is difficult to recognize the eyes of a human being, always emitting may be used. Moreover, in the color separation for blue, green and red, it is desirable to use near infrared light having light wavelength longer than 750 nm which unlikely to influence the color separation.

Hereinafter, liquid crystal drive by the pixel electrodes 9a and 9b, the common electrodes 8a and 8b and the counter electrodes 16a and 16 which are shown in FIG. 1 are described.

Figure 8:
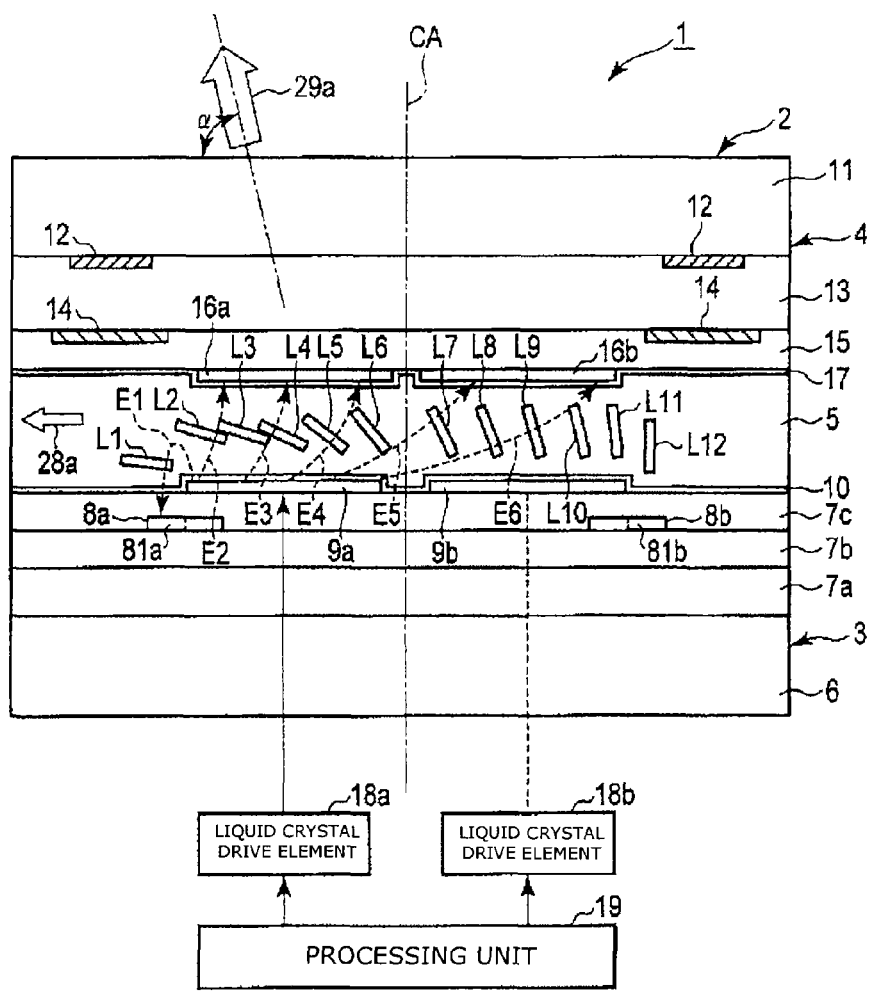
FIG. 8 is a partial cross sectional view showing an example of a state of liquid crystal drive when liquid crystal drive voltage is applied to the first pixel electrode (left side with respect to the pixel center line CA, pixel electrode in one side)

FIG. 8 is a partial cross sectional view showing an example of a state of liquid crystal driving when liquid crystal drive voltage is applied to the first pixel electrode 9a (left side with respect to the pixel center line CA, pixel electrode in one side)

The processing unit 19 switches the liquid crystal drive element 18a so as to apply liquid crystal drive voltage to the pixel electrode 9a. Then, an electric field E1 extending from the pixel electrode 9a towards the counter electrodes 16a and 16b is produced. Further, an oblique electric field (line of electric force) E2-E6 extending from the pixel electrode 9a towards the counter electrodes 16a and 16b is produced. The liquid crystal molecules L1 to L11 of the initial vertical alignment tilts towards an arrow direction 28a extending to the edge portion of the pixel from the pixel center line CA so as to be perpendicular to the electric field E1 to E6 produced by applying the liquid crystal drive voltage to the pixel electrode 9a.

The emitting light 29a which is inclined in the left direction is emitted by the liquid crystal drive as shown in FIG. 8. As described, the emitting angle α of the emitting light 29a may be adjusted by the optical control element 21 and 23.

The liquid crystal molecule L1 on the protruded portion 81a tilts strongly and rapidly according to the substantially strong electric field that extends towards the common electrode 8a from the edge portion of the pixel electrode 9a.

The liquid crystal molecules L1 to L11 tilts, triggered by tilting of the liquid crystal molecule L1, sequentially and rapidly.

Figure 9:
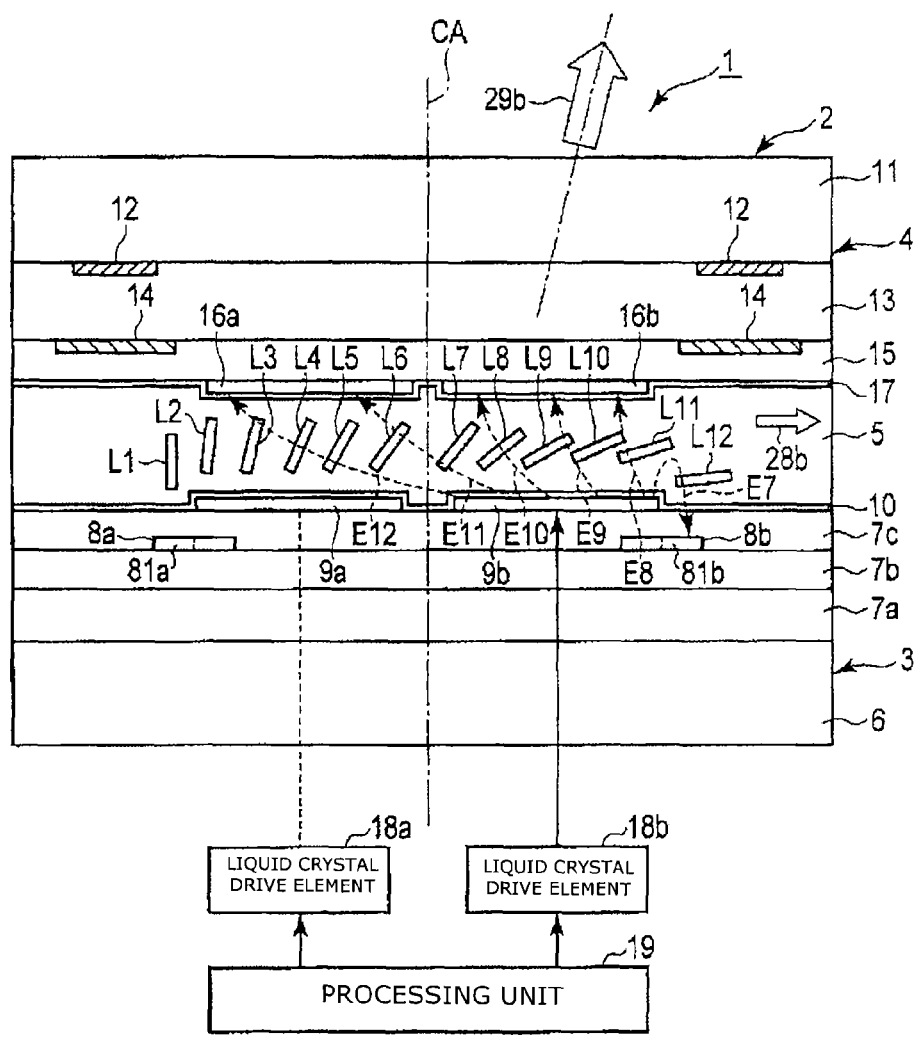
FIG. 9 is a partial cross sectional view showing an example of a state of liquid crystal drive when liquid crystal drive voltage is applied to the second pixel electrode (right side with respect to the pixel center line CA, pixel electrode in the other side)

FIG. 9 is a partial cross sectional view showing an example of a state of liquid crystal drive when liquid crystal drive voltage is applied to the second pixel electrode 9b (right side with respect to the pixel center line CA, pixel electrode in the other side).

The processing unit 19 switches the liquid crystal drive element 18b so as to apply liquid crystal drive voltage to the pixel electrode 9b. Then, an electric field E7 extending from the pixel electrode 9b towards the common electrode 8b is produced. Further, an oblique electric field (line of electric force) E8-E12 extending from the pixel electrode 9b towards the counter electrodes 16b and 16a is produced. The liquid crystal molecules L2 to L12 of the initial vertical alignment tilts towards an arrow direction 28b extending to the edge portion of the pixel from the pixel center line CA so as to be perpendicular to the electric field E8 to E12 produced by applying the liquid crystal drive voltage to the pixel electrode 9b.

The emitting light 29b which is inclined in the right direction is emitted by the liquid crystal drive as shown in FIG. 9. As described, the emitting angle α of the emitting light 29b may be adjusted by the optical control element 21 and 23.

The liquid crystal molecule L12 on the protruded portion 81b tilts greatly and rapidly according to substantially strong electric field that extends towards the common electrode 8b from the edge portion of the pixel electrode 9b.

The liquid crystal molecules L2 to L12 tilts, triggered by tilting of the liquid crystal molecule L12, sequentially and rapidly.

According to the present embodiment, when the liquid crystal drive voltage is applied to the pixel electrode 9a which is on the left side of the pixel center line CA, the liquid crystal molecules L7 to L12 arranged in the right side of the pixel center line CA can be tilted. When the liquid crystal drive voltage is applied to the pixel electrode 9b in the right side of the pixel center line CA, the liquid crystal molecules L1 to L6 arranged in the right side can be tilted so that bright three dimensional displays can be accomplished.

The liquid drive as shown in above-described FIG. 8 and FIG. 9 and light emitting of the above-described solid emitting elements 24a and 24b are performed synchronously, whereby three dimensional display or images different between to the right eye 29a direction and the left eye 29b direction can be displayed.

The liquid crystal display when the liquid crystal drive voltage is applied to both pixel electrodes 9a and 9b is illustrated in the above-described FIG. 2. The liquid crystal molecules L1 to L12 tilt towards a direction 28a and 28b extending to the edge portion of the pixel from the pixel center line CA. The liquid crystal drive voltage is applied to the pixel electrodes 9a and 9b in accordance with the same image signal, whereby bright two dimensional displays having a wide viewing angle can be accomplished. Hence, the liquid crystal display device 1 is able to switch between three dimensional displays and two dimensional displays very easily.

In the liquid crystal drive apparatus 1 according to the present embodiment, liquid crystal molecules L1 to L12 having negative dielectric anisotropy are used. However, liquid crystal molecules having positive dielectric anisotropy may be used. When the liquid crystal molecules having positive dielectric anisotropy are used, the liquid crystal molecules have initial horizontal alignment. When the liquid crystal drive voltage is applied, liquid crystal molecules having longitudinal direction being parallel to the substrate plane rise in a direction perpendicular to the substrate plane.

As a material for the liquid crystal, for example, a liquid crystal material provided with fluorine atom in the numerator structure (hereinafter referred to as fluorine-based liquid crystal) is preferably used. The fluorine-based liquid crystal has low viscosity and low relative dielectric constant and acquires less ion impurities. When using fluorine-based liquid crystal as a liquid crystal material, degradation of performance such as a decrease in a voltage holding ratio due to impurities is lowered, so that display unevenness and screen burn can be avoided. As a liquid crystal molecules having negative dielectric anisotropy, for example, nematic liquid crystal molecules having approximately 0.1 birefringence at room temperature can be used. As liquid crystal molecules having positive dielectric anisotropy, various liquid crystal materials can be applied. For a liquid crystal display device that requires high responsiveness capability rather than reducing power consumption, liquid crystal molecules having large dielectric anisotropy may be used. The thickness of the liquid crystal layer 5 is not limited. According to the present embodiment, substantially applicable Δ nd of the liquid crystal display ranges from approximately 300 nm to 500 nm. When the pre-tilt angle to the alignment films 10 and 17 is formed, for example, by using ultraviolet exposure, the horizontal alignment requires a large amount of exposure and conversely, the vertical alignment requires a smaller amount of exposure. Accordingly, considering the productivity of this alignment process, it is preferable to use the vertical alignment.

Figure 10:
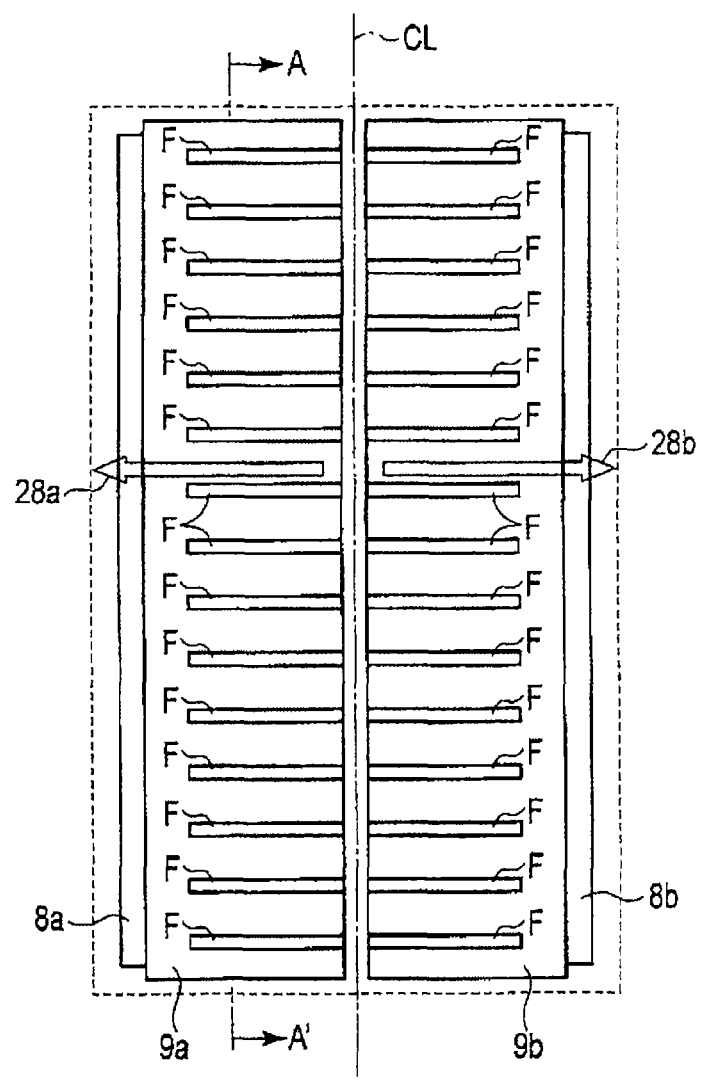
FIG. 10 is a planar view showing an example of a shape of the pixel electrode.

FIG. 10 is a planar view showing an example of a shape of the pixel electrodes 9a and 9b. FIG. 10 shows shapes of the pixel electrode 9a and 9b when viewing from liquid crystal layer 5 side.

On the surface of the pixel electrodes 9a and 9b located closely to the liquid crystal layer 5, a plurality of stripe-shaped (flaw line) patterns F are formed. The longitudinal direction of the pattern F is in parallel to the horizontal direction of the pixel. As shown in FIG. 10, by forming the pattern F on the surface of pixel electrode 9a and 9b located closely to the liquid crystal layer 5, display unevenness in the display can be reduced. Moreover, the liquid crystal molecules L1 to L12 can be tilted uniformly and more rapidly on the pixel electrodes 9a and 9b.

For example, the pattern F is formed by performing a slight etching in a linear shape with a depth ranging approximately from 20 nm to 500 nm with respect to the surface of the pixel electrode 9a having a thickness which is approximately 150 nm and a width ranging approximately from 0.5 μm to 2 μm. The pattern F applies subtle fluctuation to the liquid crystal molecules which are vertically aligned and enhances easiness of tilting of molecules and makes the response faster. For example, it is significantly different from a regulated alignment structure having height disclosed by Japanese Patent No. 3957430 in its effects and the height. According to the technique of the present invention, the direction where the liquid crystal tilts is defined by the protruded portions 81a and 81b as shown in FIG. 1.

For example, the alignment film 10 having thin thickness of appropriately 50 nm is formed on the pixel electrodes 9a and 9b, whereby the texture of the pattern F appears on the surface of the alignment film 10. The depth or height of the pattern F formed on the insulation layer 7c by the slight etching may be in a range from 20 nm to less than 1.0 μm. More preferably, the depth or height can be in a range from 20 nm to 800 nm. Further, more preferably, the depth or height can be in a range from 20 nm to 500 nm. When the depth or height exceeds 800 nm or 1 μm, it is likely to have a negative impact on the black state of the display or the transmittance. In a planar view, at a portion of the pixel electrodes 9a and 9b in which the pixel electrodes 9a and 9b and the common electrodes 8a and 8b are not overlapped, space may be formed in a stripe-shaped (slit-like shape) with a depth or height appropriately corresponding to the thickness of the pixel electrodes 9a and 9b. In a cross sectional view, a taper may be formed in the pattern F. The width of the bottom portion of the pattern F which is formed by such as an etching may preferably be less than or equal to 1 μm. The pitch between a plurality of pattern F may be within a range approximately from 2 μm to 8 μm.

Figure 11:
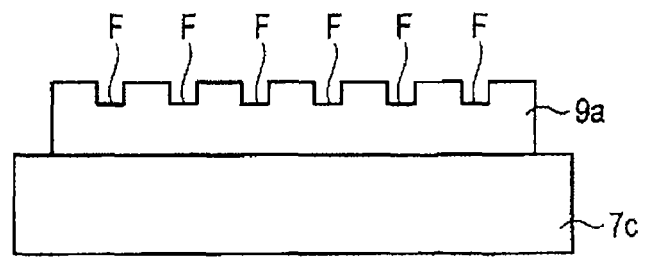
FIG. 11 is a cross sectional view showing a first example of a cross section in the longitudinal direction for the pixel electrode and an insulation layer.

FIG. 11 is a cross sectional view showing a first example of a cross section in the longitudinal direction for the pixel electrode 9a and the insulation layer 7c. This corresponds to a cross section sectioned at A-A' in FIG. 10

In FIG. 11, for example, the pixel electrode 9a is formed by a transparent conductive film such as ITO. The pattern F which is a stripe-shaped on the surface of the pixel electrode 9a is formed by performing the slight etching to the pixel electrode 9a.

When an oblique electric field is formed between the pixel electrodes 9a and 9b and the counter electrode 16a and 16b, tilting of the liquid crystal molecules showing uniform on the pixel electrodes 9a and 9b can be obtained by the pattern F formed on the pixel electrodes 9a and 9b to be in parallel thereto. When the pattern F is not formed on the pixel electrodes 9a and 9b having wide width, tilting of the liquid crystal molecules deviates in the corner portion and the center portion of the pixel electrodes 9a and 9b in planar view. Then, brightness and darkness, or nonuniformity, of the transmittance is likely to occur. These bright and dark areas or the nonuniformity cause a decrease of the transmittance of the pixel. Further, the liquid crystal molecules arranged above the pattern F are vertically aligned and influenced by the texture produced by the pattern F, so that the liquid crystal molecules arranged above the pattern F can easily be tilted in low voltage. Hence, the liquid crystal molecules arranged above the pattern F can be driven faster. The pattern F is formed based on the width of the pixel electrodes 9a and 9b, as a single pattern or a plurality number of patterns. When the width of the pixel electrodes 9a and 9b is, for example, narrower than or equal to 3 μm, the pattern F may not be formed.

Figure 12:
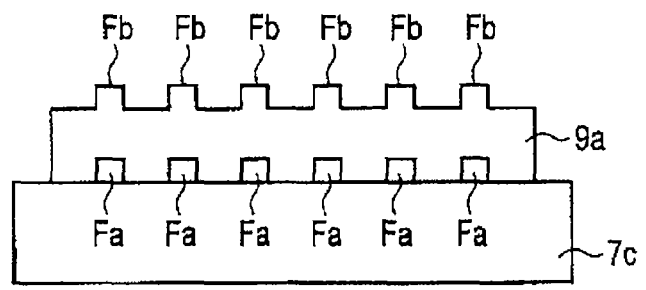
FIG. 12 is a cross sectional view showing a second example of a cross section in the longitudinal direction for the pixel electrode and an insulation layer.

FIG. 12 is a cross sectional view showing a second example of a cross section in the longitudinal direction for the pixel electrode 9a and the insulation layer 7c.

In FIG. 12, an isolation pattern Fa having convex shape and linear shape is formed in advance on the insulation layer 7c of the array substrate 3. The pixel electrode 9a is formed on the insulation layer 7c on which the isolation pattern Fa is formed. As a result, a pattern Fb having convex shape and linear shape is formed on the surface of the pixel electrode 9a. According to the pattern Fb as shown in FIG. 12, similar effects of the pattern F as shown in FIG. 11 can be obtained.

Figure 13:
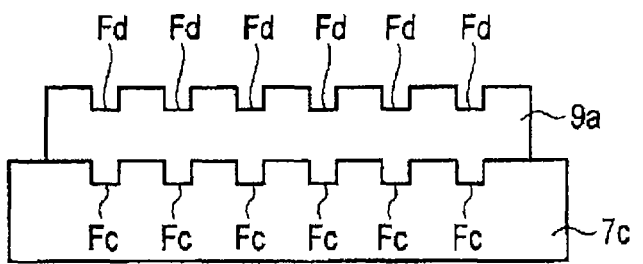
FIG. 13 is a cross sectional view showing a third example of a cross section in the longitudinal direction for the pixel electrode and an insulation layer.

FIG. 13 is a cross sectional view showing a third example of a cross section in the longitudinal direction for the pixel electrode 9a and the insulation layer 7c.

In FIG. 13, the surface of the insulation layer 7c of the array substrate 6 is etched to form a stripe-shaped concave portion pattern Fc. The pixel electrode 9a is formed on the insulation layer 7c on which the concave portion pattern Fc is formed. As a result, a stripe-shaped concave portion pattern Fd is formed on the surface of the pixel electrode 9a. According to the pattern Fd as shown in FIG. 12, similar effects of the pattern F as shown in FIG. 11 can be obtained.

In the present embodiment, for example, to enable touch sensing, the processing unit 19 may detect electrostatic capacitance formed between the counter electrodes 16a and 16b and the common electrodes 8a and 8b of the array substrate 3. Thus, a touch sensing function can be provided in the liquid crystal display device 1.

In the present embodiment, the alignment films 10 and 17 may be an organic film to which a pre-tilt angle is applied by light emission under an electric field. The alignment films 10 and 17 are formed at a location contacted with the liquid crystal layer 5. Regarding the alignment films 10 and 17, a pre-tilt forming function is implemented to liquid crystal molecules by irradiating a radiation such as light or heat rays to the alignment film having photosensitivity that vertically aligns the liquid crystal molecules or irradiating these radiations under electric field. As radiation, ultraviolet light may be used. In a unit subpixel or unit pixel, the alignment film 10 is formed at a flat surface portion of the array substrate 3, and the alignment film 17 is formed at a flat surface portion of the counter substrate 4. As for the pre-tilt function by the alignment films 10 and 17, the pre-tilt angle may be applied to the liquid crystal molecules, within a range practically from 0.1 degrees to 1.5 degrees, or more preferably, within a range from 0.1 degree to 1.0 degrees. Since the liquid crystal display device 1 uses an oblique electric field, even when the pre-tilt angle is a minute angle such as less than 1 degree, the liquid crystal molecules L1 to L12 of the liquid crystal layer 5 can be driven at high speed.

Regarding normally-black liquid crystal molecules L1 to L12 having vertical alignment, the smaller the pre-tilt angle applied by the alignment films 10 and 17, the lower the light leakage of the black display and high contrast that can be obtained. However, usually, in the liquid crystal molecule L1 of the vertical alignment having small pre-tilt angle, the liquid crystal drive voltage in low voltage side is high so that reproducibility of operations from the black display to the half-tone display is decreased.

When using the alignment films 10 and 17, even with a minute pre-tilt angle, a half-tone display with fast liquid crystal response at low voltage can be accomplished. Additionally, when using the alignment films 10 and 17, the power consumption can be reduced by the low voltage drive.

In the pre-tilt angle of the vertical alignment liquid crystal, the contrast is likely to decrease when the pre-tilt angle is larger than approximately 1.5 degrees. Hence, in terms of a contrast, smaller pre-tilt angle is preferable. The configuration of the electrodes according to the present embodiment enables faster liquid crystal response and smooth half-tone display by electric field between the pixel electrodes 9a and 9b and the protruded portions 81a and 81b, and oblique electric field formed between the pixel electrodes 9a and 9b and the counter electrodes 16a and 16b.

As a photosensitivity alignment film before applying alignment processing for forming alignment films 10 and 17 that applies the pre-tilt angle to the liquid crystal molecules, for example, photo sensitive polyorganosiloxane or a polymer containing photo sensitive polyorganosiloxane and polyamic acid or a polyimide may be employed. The alignment films 10 and 17 may contain siloxane polymer represented by siloxane thin Amato. As the alignment films 10 and 17, for example, photosensitive polyimide or coating film such as photosensitive polymerizable liquid crystal material may be used. As the alignment films 10 and 17, for example, a light alignment film using an azobenzene derivative or light alignment film containing polyamic acid having a triple bond as a principal chain may be employed. It is noted that the pre-tilt angle is measured by, for example, a crystal rotation method described in Journal of Applied Physics, Vol. 48 No. 5, p. 1783-1792 (1977).

According to the above-described present embodiment, the display quality of the three dimensional display can be improved, three dimensional displays and the two dimensional displays can be exchanged, and a bright display can be accomplished.

Second Embodiment

In the present embodiment, a flow chart shows an example of manufacturing step concerning the manufacturing method of the counter substrate 4 according to the above-described first embodiment.

Figure 14:
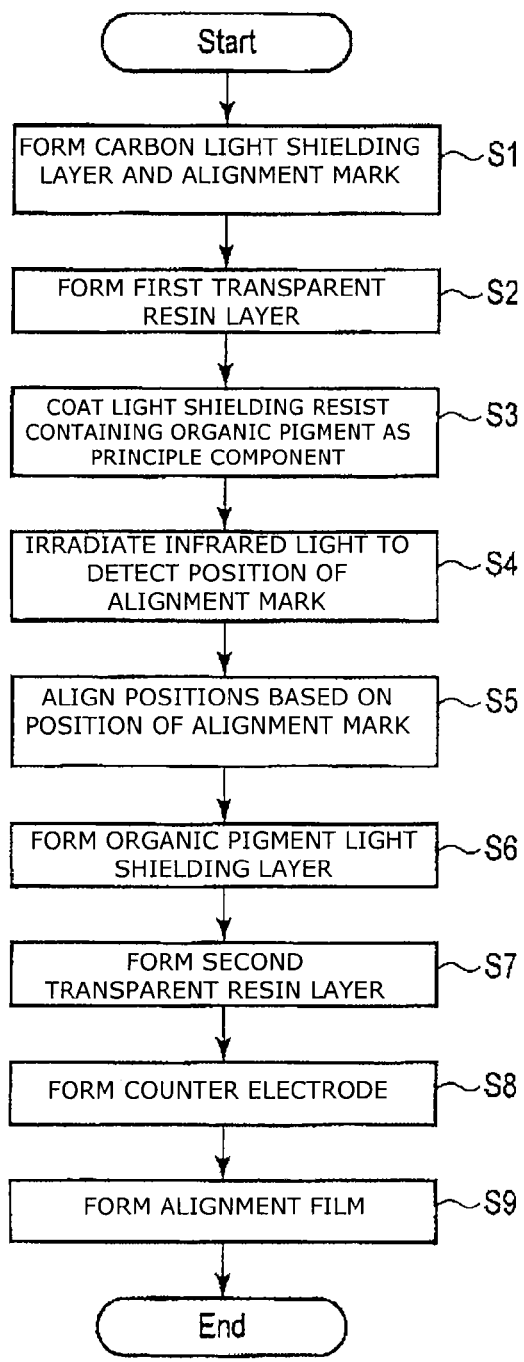
FIG. 14 is a flowchart showing an example of a manufacturing method of a counter substrate according to the first embodiment.

FIG. 14 is a flowchart showing an example of a manufacturing method of a counter substrate 4 according to the present embodiment.

At step S1, a light shielding color material containing carbon pigment as a principal component is coated on the transparent substrate 11, exposed and then developed. Thus, the carbon pigment light shielding layer 12 and alignment marks are formed. In step S1, as a manufacturing apparatus, a coating apparatus, a drying machine, an exposure apparatus, a development apparatus, and a cured film apparatus are used. As a representative drying machine and cured film apparatus, a clean oven and a hot plate are used.

At step S2, by using the coating apparatus and the cured film apparatus, the first transparent resin layer 13 is formed.

At step S3, by using the coating apparatus, a light shielding resist containing a light shielding color material including an organic pigment as a principal component is coated on the whole surface of the substrate.

At step S4, in the alignment process by the exposure apparatus using a photo mask, infrared light is irradiated so as to detect a position of the alignment marks by an infrared light sensor.

At step S5, based on the position of the alignment marks, a position of the photo mask used for the patterning and a position of the transparent substrate are aligned, then exposure is carried out.

At step S6, the light shielding resist is exposed, developed and cured so as to form an organic pigment light shielding layer 14. At step S6, as a manufacturing apparatus, for example, a development apparatus, a cured film apparatus are used.

At step S7, by using the coating apparatus and the cured film apparatus, the second transparent resin layer 15 is formed.

At step S8, by using existing photolithography technique, the counter electrodes 16a and 16b are formed. In this photolithography technique, as a manufacturing apparatus, a sputtering film forming apparatus, a coating apparatus using a photosensitive resist, a drying machine, an exposure apparatus, a development apparatus and a film remover are used.

At step S9, the manufacturing apparatus forms the alignment film 17. In step S9, as a manufacturing apparatus, a transferring apparatus or a printing machine such as an inkjet machine, and a film curing apparatus can be employed.

According to the present embodiment, by using the alignment marks containing carbon pigment as a principal component of the light shielding color material, a position alignment necessary for forming the organic pigment of light shielding layer 14 can be done.

When the counter electrodes 16a and 16b are not necessary on the counter substrate 4, step S8 can be omitted. When the alignment film 17 is not necessary on the counter substrate 4, step S9 is omitted.

Hereinafter will be described a manufacturing method of the above-described counter substrate 4 as shown in FIG. 14 in detail.

Figure 15:
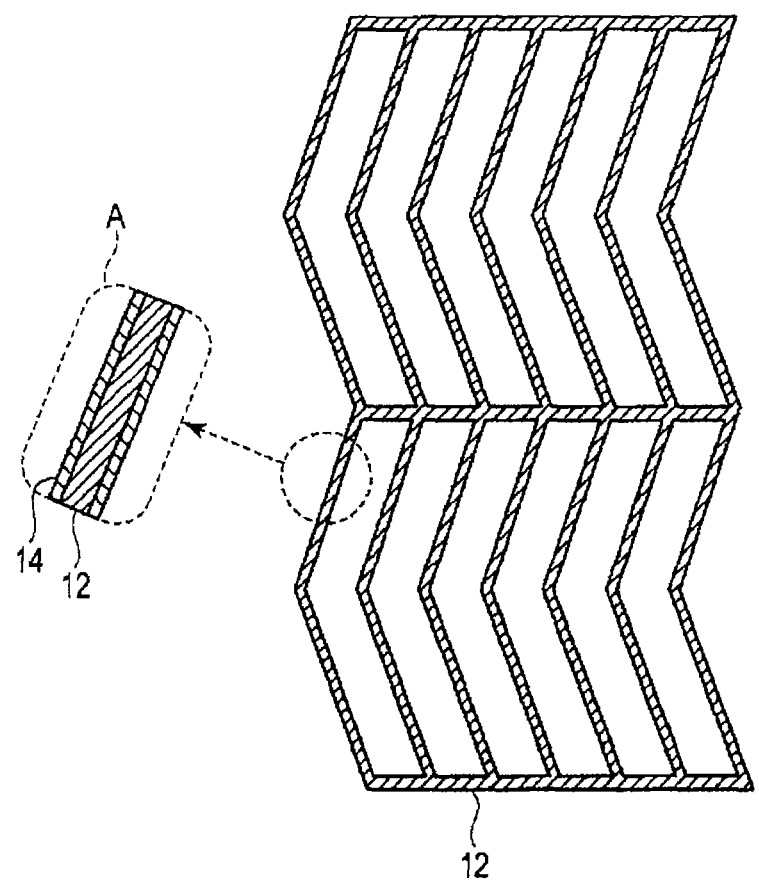
FIG. 15 is a planar view showing an example of a pixel shape according to the second embodiment.

For example, as shown in FIG. 15, a V-shaped (doglegged shape) polygon pixel pattern is formed. In the V-shape, two edges which directly face each other are parallel. Regarding the carbon pigment light shielding layer 12 and the carbon pigment light shielding layer, the widths (thickness) are different from each other in planar view and the center line of the carbon pigment light shielding layer 12 and the center line of the organic pigment light shielding layer 14 are overlapped.

First, a black resist 1 (first black resist) for forming the carbon pigment light shielding layer 12 is coated on the whole surface of the transparent substrate 11, e.g., glass substrates such that the film thickness of the coating film after drying becomes approximately 1.5 µm.

Next, the substrate is prebaked for 20 minutes at 70 degrees C. in the clean oven and cooled to room temperature. Then, by using an extra-high pressure mercury lamp, the substrate is exposed to ultraviolet light via the photo mask. At this moment, alignment marks having a cross shape are formed at a portion of the outermost periphery in the substrate. Subsequently, by using the development apparatus, the substrate is spray-developed by using sodium carbonate solution at 23 degrees C., cleaned by deionized water, and then air dried. Further, the substrate is post baked for 30 minutes at 230 degrees C. in the clean oven to form the carbon pigment light shielding layer 12.

Next, after forming the carbon pigment light shielding layer 12, by using the coating apparatus, the first transparent resin layer 13 is formed by coating with a film thickness of approximately 2 µm.

Next, after the first transparent resin layer 13 is cured, a black resist 2 (second black resist) containing an organic pigment as a principal component of the light shielding color material for forming the organic pigment light shielding layer 14 is coated, by using the coating apparatus, on the whole substrate to produce the film thickness of the coating film after drying to be approximately 1.5 µm.

After the substrate is prebaked for 20 minutes at 70 degrees C. on the hot plate, the substrate is further cooled until the room temperature. Then, the substrate is set up on the exposure apparatus provided with an extra-high pressure mercury lamp.

At this moment, by using the exposure apparatus, infrared light having 850 nm light wavelength is projected from the back side of the substrate and the infrared light emitted from the front surface of the substrate (coated film surface of the black resist 2) is detected by the infrared light sensor, whereby the position of the alignment marks is detected. As shown in FIG. 6, the carbon light shielding film 12 and the alignment marks do not allow infrared light to transmit therethrough, however, the black resist 2 allows the infrared light to transmit therethrough. Hence, by using the infrared light, the alignment marks can be detected so that a position can be aligned accurately. The wavelength of the infrared light may preferably set to be in a long wavelength range which is longer than a light wavelength of 800 nm. When a CCD or CMOS sensor is used for the infrared light sensor, infrared light based on the sensitivity region of the semiconductor included in the infrared light sensor is employed.

Subsequently, by using the same exposure apparatus, after the position alignment, the substrate is exposed to ultraviolet ray via the photo mask by using the extra-high pressure mercury lamp. After that, by using the development apparatus, the substrate is spray-developed by using sodium carbonate solution at 23 degrees C., cleaned with deionized water, and then air dried. Further, the substrate is post baked for 30 minutes at 230 degrees C. in the clean oven and cured to form the organic pigment light shielding layer 14.

Next, the second transparent resin layer 15 is coated on the organic pigment light shielding layer 14 and cured.

As a next step, by using a sputtering film forming apparatus, a transparent conductive film such as ITO is formed on the second transparent resin layer 15.

Then, the transparent conductive film is processed to form a pattern of the counter electrodes 16a and 16b by using an existing photolithography technique. As a photolithography technique, for example, exposure and development techniques using photoresist, etching technique of either wet method or dry method are employed.

Next, the alignment film 17 is formed on the second resin layer 15.

As a result, the counter substrate 4 is produced.

In the liquid crystal display device of the liquid crystal drive method such as IPS or FFS, the counter electrodes 16a and 16b can be omitted.

The liquid crystal display device 1 includes a red solid emitting element, blue solid emitting element and green solid emitting element in the backlight unit 22. Emission from these solid emitting elements in a time division manner (field sequential) and the liquid crystal drive are synchronized, whereby color display can be accomplished.

In the manufacturing step of the counter substrate 4 according to the present embodiment, even after the black resist 2 for forming the organic pigment light shielding layer 14 is coated, a position alignment can be accurately made.

Third Embodiment

According to the third embodiment, a liquid crystal display device is described in which a color filter used for a color display is provided in the counter substrate 4 according to the above-described first and second embodiments. In the present embodiment, a colored pixel has a shape extending in the longitudinal direction. The pixel includes any of a red filter, green filter or blue filter. It should be noted that two sub pixels having identical color may be a single pixel.

Figure 16:
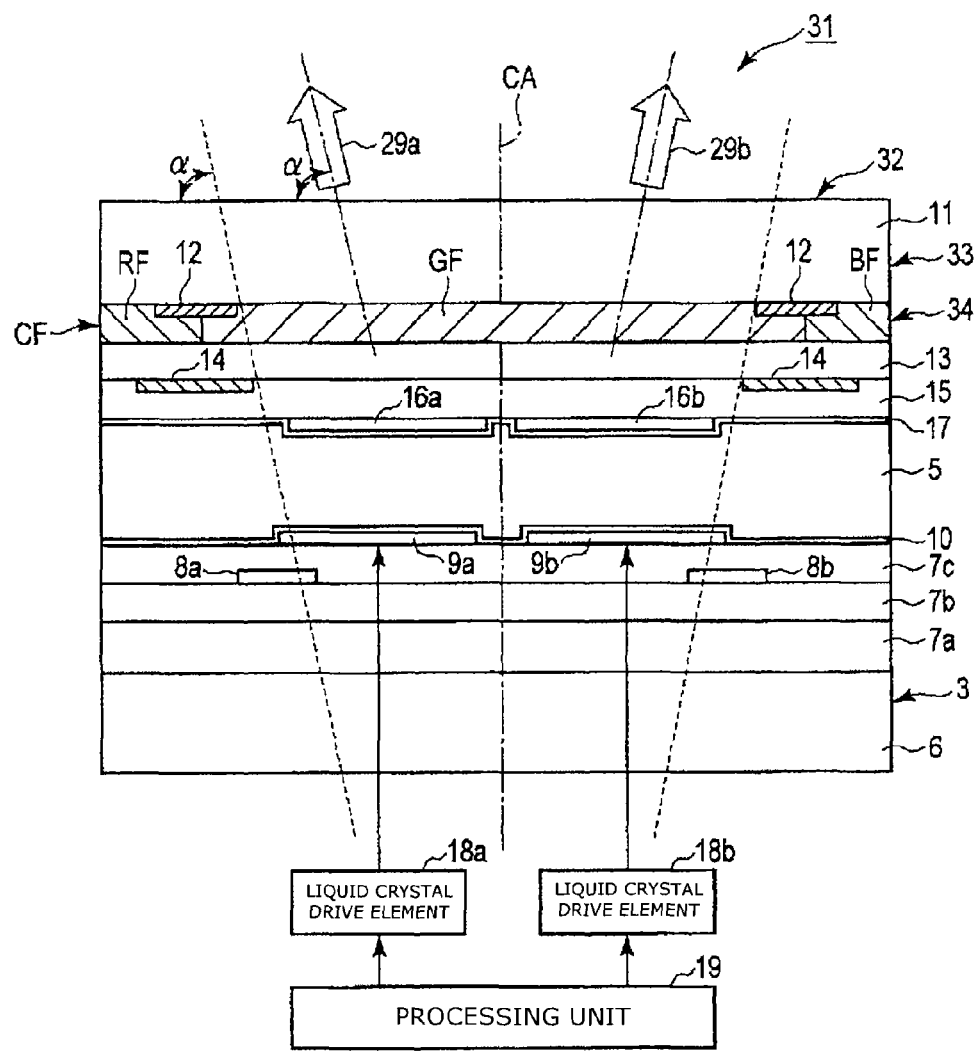
FIG. 16 is a partial cross sectional view showing an example of a configuration of a liquid crystal panel provided in a liquid crystal display device according to the third embodiment.

FIG. 16 is a partial cross sectional view showing an example of a configuration of a liquid crystal panel 32 provided in the liquid crystal display device 31 according to the present embodiment. FIG. 16 is a cross-sectional view sectioned across the horizontal direction (pixel width direction) of the pixel of the liquid crystal panel 32. FIG. 16 illustrates a state under a condition in which the liquid crystal drive voltage is applied. In the liquid crystal panel 32, a polarizing plate and a phase difference plate are omitted.

The counter substrate 33 of the liquid crystal display device 31 includes a color filter layer CF between the transparent substrate 11 and the first transparent resin layer 13. The color filter layer CF includes a carbon resin layer 12 and a color filter 34 including a red filter RF, a green filter GF and a blue filter BF.

Figure 17:
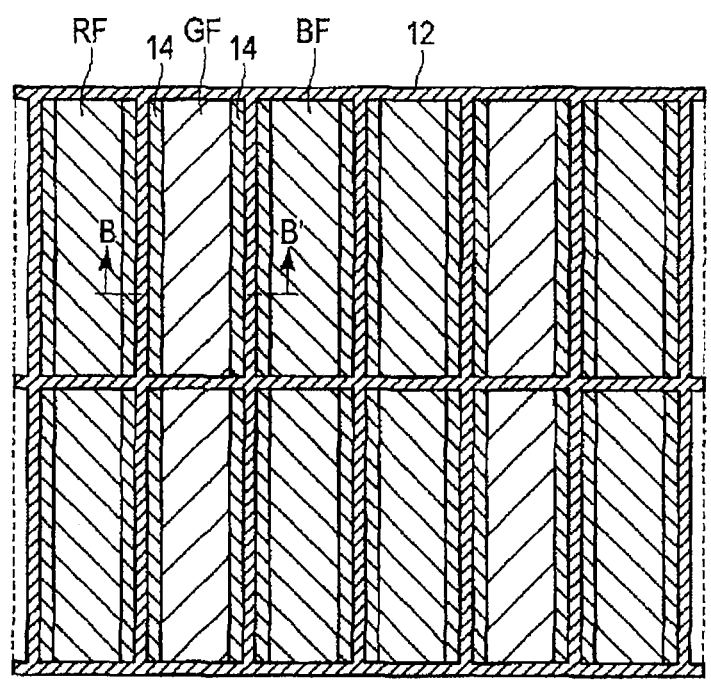
FIG. 17 is a partial cross sectional view showing an example of a counter substrate side of a liquid crystal panel according to the third embodiment.

FIG. 17 is a partial cross sectional view showing an example of a counter substrate 33 of a liquid crystal panel 32 according to the present embodiment. FIG. 17 illustrates a state where the liquid crystal panel 32 is viewed from the observer side. FIG. 16 corresponds to a cross section sectioned along B-B' in FIG. 17.

In the present embodiment, the carbon pigment light shielding layer 12 is a matrix pattern including a plurality of rectangles and the organic pigment light shielding layer 14 is a linear pattern. Each of the pixels is shaped in a rectangle. The organic pigment light shielding layer 14 overlaps at two side edge portions of the carbon pigment light shielding layer 12.

The carbon pigment light shielding layer 12 serving as a black matrix has two side edge portions which face each other in planar view. The two side edge portions are parallel to each other. The line width of the carbon pigment light shielding layer 12 is narrower than the line width of the organic pigment light shielding layer 14. In planar view, the center axis of the side edge of the carbon pigment light shielding layer 12 (center line extending in an extending direction of the linear pattern of the carbon pigment light shielding layer) and the center axis of the organic pigment light shielding layer 14 (center line extending in an extending direction of the linear pattern of the organic pigment light shielding layer 14) are overlapped. Such a state in which the carbon pigment light shielding layer and the organic pigment light shielding layer 14 are overlapped is able to improve effects of the three dimensional display.

Figure 18:
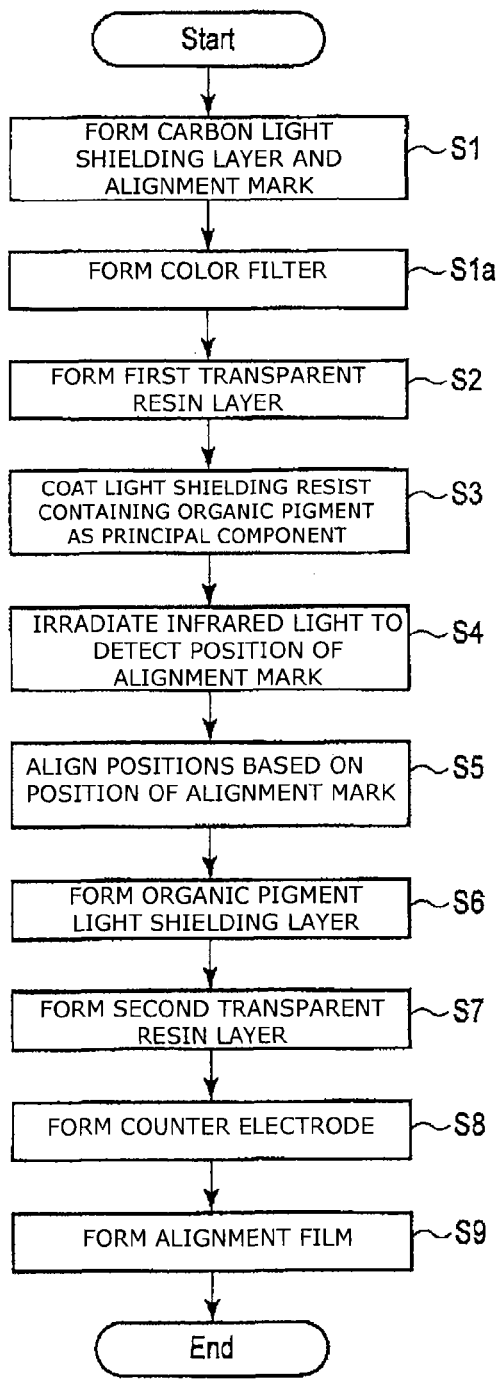
FIG. 18 is a flowchart showing an example of a manufacturing method of a counter substrate according to the third embodiment.

FIG. 18 is a flowchart showing an example of a manufacturing method of a counter substrate 33 according to the present embodiment.

In the manufacturing method of FIG. 18, step S1a for forming a color filter 34 between step S1 and step S2 is different from the manufacturing method of FIG. 14 and other steps are similar.

Hereinafter, a manufacturing method of the counter substrate 33 as shown in FIG. 18 is described in detail.

First, a black resist 1 for forming the carbon pigment light shielding layer 12 is coated on the whole surface of the transparent substrate 11 such as a glass substrate to produce the film thickness of the coating film after drying to be approximately 1.5 μm.

Next, the substrate is prebaked for 20 minutes at 70 degrees C. in the clean oven and cooled to room temperature. Then, by using an extra-high pressure mercury lamp, the substrate is exposed to ultraviolet light via the photo mask. At this moment, an alignment marks having cross shape is formed at a portion of the outermost periphery in the substrate. Subsequently, the substrate is spray-developed by using sodium carbonate solution at 23 degrees C., cleaned with deionized water, and then air dried. Further, the substrate is post baked for 30 minutes at 230 degrees C. in the clean oven to form the carbon pigment light shielding layer 12.

The pattern of the carbon pigment light shielding layer 12 may be, for example as shown FIG. 17, a rectangular shape matrix pattern having an opening region.

Next, red resist is coated to the substrate so as to produce the film thickness 2.5 μm and dried. Then, a colored layer having a stripe-shape is exposed by the exposure apparatus and developed, whereby a pattern of the red filter RF is formed.

Next, green resist is coated to the substrate so as to produce the film thickness 2.5 μm and dried. Then, a colored layer having a stripe-shape is exposed by the exposure apparatus and developed, whereby a pattern of the green filter GF is formed.

Next, blue resist is coated to the substrate so as to produce the film thickness 2.5 μm and dried. Then, a colored layer having a stripe-shape is exposed by the exposure apparatus and developed, whereby a pattern of the blue filter BF is formed.

The manufacturing steps of the development and the cured film for the above-described red filter RF, the green filter GF and the blue filter BF are the same as the manufacturing steps for forming the organic pigment light shielding layer 12.

After forming the red filter RF, the green filter GF and the blue filter BF, the first transparent resin layer 13 is formed by coating with approximately 2 μm film thickness.

Next, after the first transparent resin layer 13 is cured, black resist 2 containing an organic pigment as a principal component of the light shielding color material for forming the organic pigment light shielding layer 14 is coated, by using the coating apparatus, on the whole substrate to produce the film thickness of the coating film after drying to be approximately 1.5 μm.

Further, the substrate is prebaked for 20 minutes at 70 degrees C. and the substrate is cooled until the room temperature. Then, the substrate is set up on the exposure apparatus provided with an extra-high pressure mercury lamp.

Next, by using the exposure apparatus, infrared light having 850 nm light wavelength is projected from the back side of the substrate and the infrared light emitted from the front surface of the substrate (coated film surface of the black resist 2) is detected by the infrared light sensor, whereby the position of the alignment marks is detected. As shown in FIG. 6, the carbon light shielding film 12 and the alignment marks do not allow infrared light to transmit therethrough, however, the black resist allows the infrared light to transmit therethrough. Hence, by using the infrared light, the alignment marks can be detected so that a position can be aligned accurately. The wavelength of the infrared light may preferably set to be in a long wavelength range which is longer than a light wavelength of 800 nm. When a CCD or CMOS sensor is used for the infrared light sensor, infrared light based on the sensitivity region of the semiconductor included in the infrared light sensor is employed.

Subsequently, by using the same exposure apparatus, after the position alignment, the substrate is exposed to ultraviolet light via the photo mask having the organic pigment light shielding layer 14 by using the extra-high pressure mercury lamp. After that, by using the development apparatus, the substrate is spray-developed by using sodium carbonate solution at 23 degrees C., cleaned with deionized water and, then air dried. Further, the substrate is post baked for 30 minutes at 230 degrees C. in the clean oven and cured to form the organic pigment light shielding layer 14.

Next, the second transparent resin layer 15 is coated on the organic pigment light shielding layer 14 by using the coating apparatus and then cured.

Next, on the second transparent resin layer 15, for example, a transparent conductive film which is represented by ITO is formed and then, by using existing photolithography technique, for example, the counter electrodes 16a and 16b having a comb-like pattern are formed.

Subsequently, the alignment film 17 is formed on the counter electrodes 16a and 16b.

As a result, the counter substrate 33 is produced.

According to the present embodiment, in the manufacturing step of the counter substrate 33 including the color filter 34, even after the black resist 2 for forming the organic pigment light shielding layer 14 is applied, a position alignment can be accurately made.

Fourth Embodiment

In the present embodiment, an example of the color separation in the liquid crystal display device 31 according to the above-described third embodiment will be described.

Figure 19:
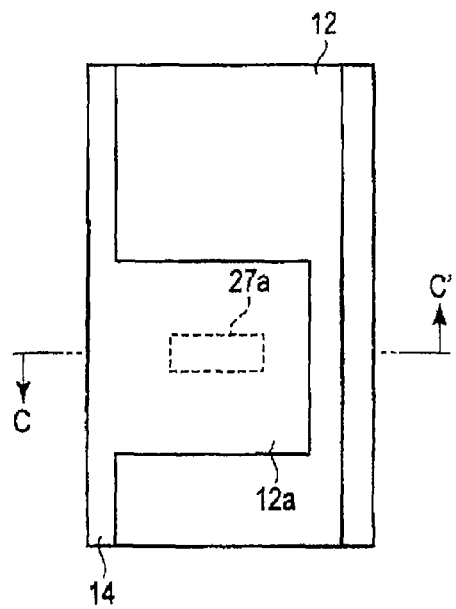
FIG. 19 is a partial planar view showing an example of a side edge portion of a pixel at which a carbon pigment light shielding layer and an organic pigment light shielding layer according to the fourth embodiment are overlapped.

FIG. 19 is a partial planar view showing an example of a pixel side portion A at which the carbon pigment light shielding layer 12 and the organic pigment light shielding layer 14 according to the present embodiment are overlapped. FIG. 19 is a planar view in which the counter substrate 33 is viewed from the display surface of the liquid crystal panel 32.

The pixel side portion 12 of the carbon pigment light shielding layer 12 has a missing portion 12a in planar view (i.e., a direction perpendicular to the substrate plane). In the missing portion 12a at which the carbon pigment light shielding layer 12 is missing, the organic pigment light shielding layer 14, the red filter RF, the green filter GF, or the blue filter BF are optically overlapped in planar view. In FIG. 19, the red filter RF, the green filter GF or the blue filter BF are omitted and this illustrates a relationship between the carbon pigment light shielding layer 12 and the organic pigment light shielding layer 14 which are overlapped.

In a portion 12a in which a pattern of the carbon pigment light shielding layer 12 is not formed, in planar view, an optical sensor (light receiving element) 27a is further disposed.

FIG. 20 is a partial cross sectional view showing an example of a cross section in the horizontal direction at a portion 12a in which a pattern of the carbon pigment light shielding layer 12 is not formed.

FIG. 20 exemplifies a case where the optical sensors 27a, 27b overlap with the green filter GF in a direction perpendicular to the substrate plane.

At a light incident side of the optical sensor 27a (second optical sensor), the green filter GF and the organic pigment light shielding layer 14 are overlapped. The optical sensor 27a detects light that passes through the green filter GF and the organic pigment light shielding layer 14.

At a light incident side of the optical sensor 27b (first optical sensor), the green filter GF is disposed. However, the carbon pigment light shielding layer 12 and the organic pigment light shielding layer 14 are not provided.

The processing unit 19 subtracts the detection data of the optical sensor 27a from the detection data of the optical sensor 27b, whereby high precision detection data for the green component is produced.

Figure 21:
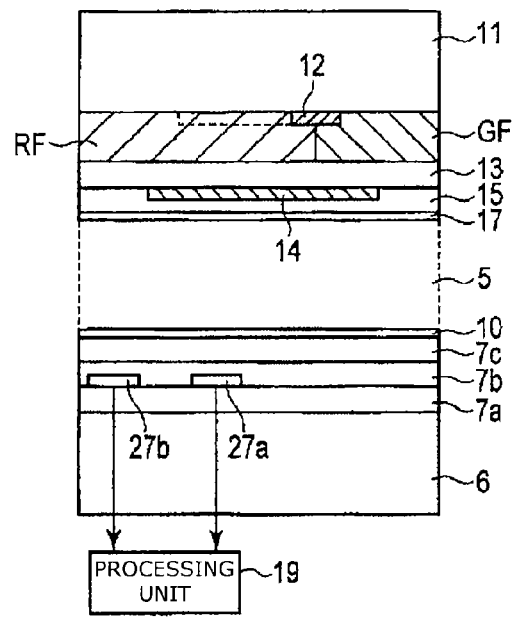
FIG. 21 is a partial cross sectional view showing a second example of a cross section in the horizontal direction at a portion in which a pattern of the carbon pigment light shielding layer is not formed.

FIG. 21 exemplifies a case where the optical sensors 27a, 27b overlap with the red filter RF in a direction perpendicular to the substrate plane.

At a light incident side of the optical sensor 27a (second optical sensor), the red filter RF and the organic pigment light shielding layer 14 are overlapped. The optical sensor 27a detects light that passes through the red filter RF and the organic pigment light shielding layer 14.

At a light incident side of the optical sensor 27b (first optical sensor), the red filter RF is disposed. However, the carbon pigment light shielding layer 12 and the organic pigment light shielding layer 14 are not provided.

The processing unit 19 subtracts the detection data of the optical sensor 28a from the detection data of the optical sensor 28b, whereby high precision detection data for the red component is produced.

Figure 22:
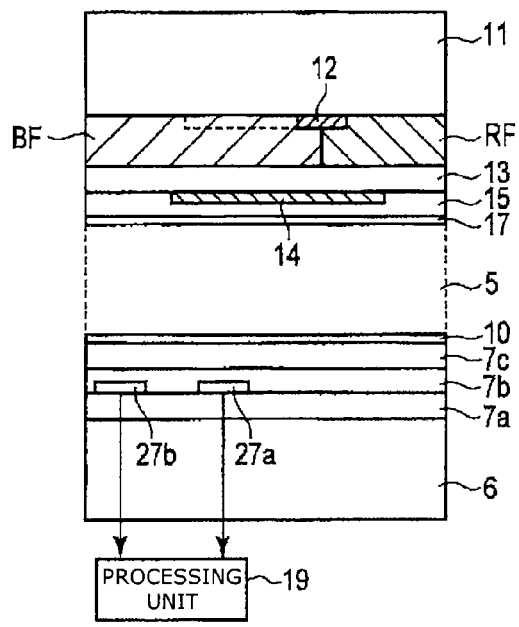
FIG. 22 is a partial cross sectional view showing a third example of a cross section in the horizontal direction at a portion in which a pattern of the carbon pigment light shielding layer is not formed.

FIG. 22 exemplifies a case where the optical sensors 27a, 27b overlap with the blue filter BF in a direction perpendicular to the substrate plane.

At a light incident side of the optical sensor 27a (second optical sensor), the blue filter BF and the organic pigment light shielding layer 14 are overlapped. The optical sensor 27a detects light that passes through the blue filter BF and the organic pigment light shielding layer 14.

At a light incident side of the optical sensor 27b (first optical sensor), the blue filter BF is disposed. However, the carbon pigment light shielding layer 12 and the organic pigment light shielding layer 14 are not provided.

The processing unit 19 subtracts the detection data of the optical sensor 28a from the detection data of the optical sensor 28b, whereby high precision detection data for the blue component is produced.

Figure 23:
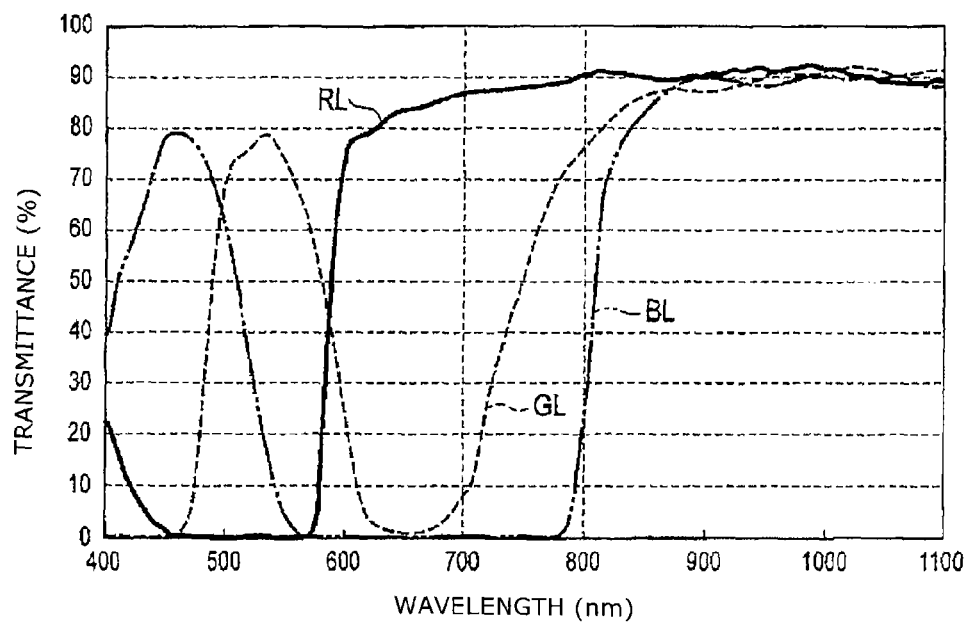
FIG. 23 is a graph showing an example of a spectral characteristic of a color filter according to the fourth embodiment.

FIG. 23 is a graph showing an example of a spectral characteristic of a color filter according to the present embodiment.

The color filer CF adapted for the liquid crystal display device 31 includes the red filter RD, the green filter GF and the blue filter BF. The characteristics RL is a spectral characteristic of the red filter RF. The characteristics GL is a spectral characteristic of the green filter GF. The characteristics BL is a spectral characteristic of the blue filter BF.

The transmittances of the red filter RF, the green filter GF and the blue filter BF are significantly different in a long wavelength region longer than a light wavelength of 700 nm.

Therefore, in a case where the liquid crystal display device 31 including the optical sensor 27b is used for a color copier or an imaging device, for example, in a wavelength range of the near infrared region which is approximately 700 nm to 1100 nm, precise color separation of red, green and blue is difficult if the light receiving component is not eliminated.

The semiconductors included in the thin film transistor such as amorphous silicon or poly silicon detect light in a wavelength region ranging from a light wavelength of 400 nm to 1100 nm.

Figure 24:
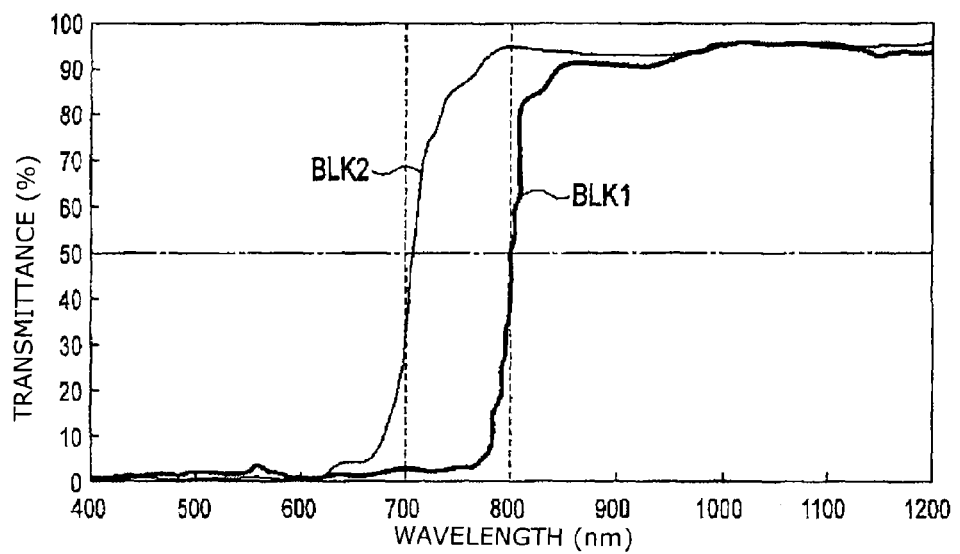
FIG. 24 is a graph showing an example of light shielding characteristics for a carbon pigment light shielding layer and light shielding characteristics for an organic pigment light shielding layer.

FIG. 24 is a graph showing an example of light shielding characteristics BLK1 for an organic pigment light shielding layer 14 and light shielding characteristics BLK2.

The carbon pigment light shielding layer 12 which is not shown includes carbon pigment as a major light shielding color material. The transmittance of the carbon pigment light shielding layer 12 is a low transmittance lower than or equal to 1.0% in a visible range including a light wavelength of approximately 400 nm to 900 nm.

The transmittance of the organic pigment light shielding layer 14 rises at a longer wavelength from light wavelength approximately 670 nm and higher, and maintains high transmittance in a longer wavelength region from approximately light wavelength 700 nm and more.

The organic pigment light shielding layer 14 is capable of suppressing transmission of light in a wavelength region shorter than light wavelength approximately 660 nm.

Figure 25:
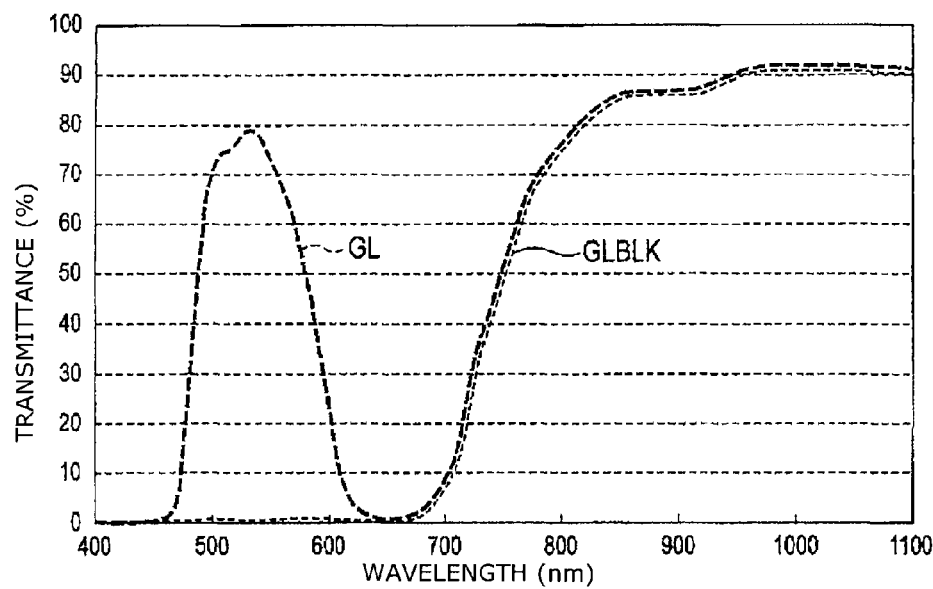
FIG. 25 is a graph showing an example of transmission characteristics of a green filter and transmission characteristics of a green filter and an organic pigment light shielding layer which are overlapped with each other.

FIG. 25 is a graph showing an example of transmission characteristics GL of a green filter GF and transmission characteristics GLBLK of a green filter GF and an organic pigment light shielding layer 14 which are overlapped with each other.

A portion in which respective single color layers of the red filter RF, the blue filter BF and the green filter GF included in the color filter CF and the organic pigment light shielding layer 14 are overlapped in order to detect light may be named as a portion optically overlapped.

Precise green detection data in the visible light region is obtained by subtracting detection data of light detected by optically overlapping the green filter GF and the organic light shielding layer 14 from detection data of light detected via the green filter GF.

Thus, green detection data in the visible light region can be extracted by subtracting detection data of light detected by optically overlapping the green filter GF and the organic light shielding layer 14 from detection data of light detected via the green filter GF.

Figure 26:
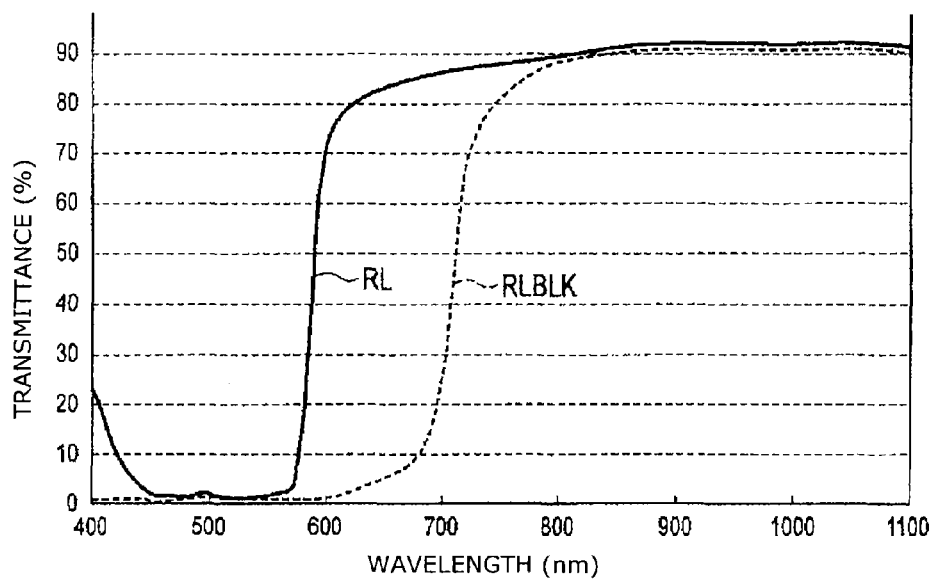
FIG. 26 is a graph showing an example of transmission characteristics of a red filter and transmission characteristics of a red filter and an organic pigment light shielding layer which are overlapped with each other.

FIG. 26 is a graph showing an example of transmission characteristics RL of a red filter RF and transmission characteristics RLBLK of a red filter RF and an organic pigment light shielding layer 14 which are overlapped with each other Precise red detection data in the visible light region is obtained by subtracting detection data of light detected by optically overlapping the red filter RF and the organic light shielding layer 14 from detection data of light detected via the red filter RF.

Thus, only the red detection data in the visible light region can be extracted by subtracting detection data of light detected by optically overlapping the red filter RF and the organic light shielding layer 14 from detection data of light detected via the red filter GF.

Figure 27:
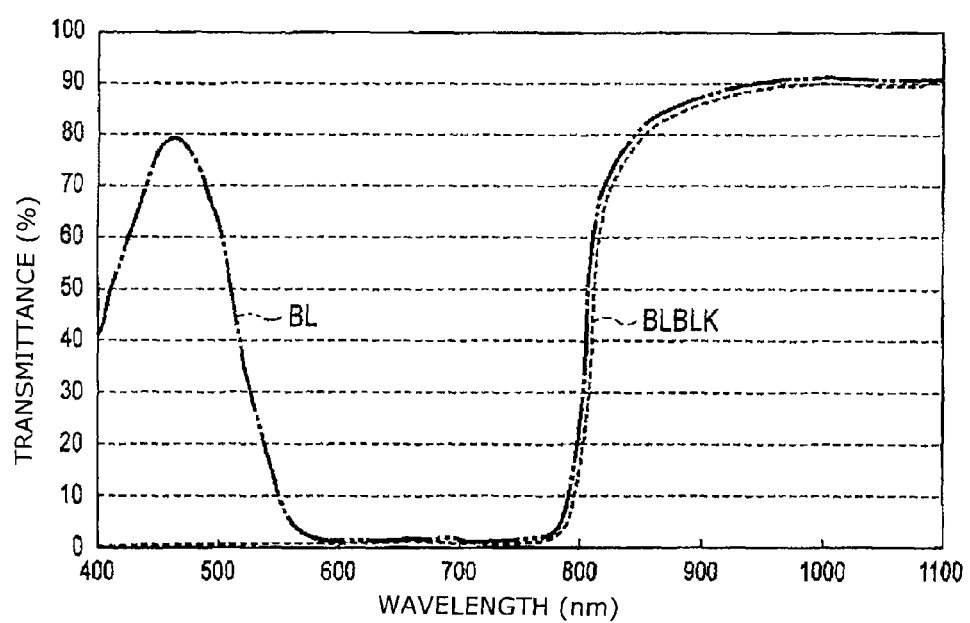
FIG. 27 is a graph showing an example of transmission characteristics of a blue filter and transmission characteristics of a blue filter and an organic pigment light shielding layer which are overlapped with each other.

FIG. 27 is a graph showing an example of transmission characteristics BL of a blue filter BF and transmission characteristics BLBLK of a blue filter BF and an organic pigment light shielding layer 14 which are overlapped with each other Precise blue detection data in the visible light region is obtained by subtracting detection data of light detected by optically overlapping the blue filter BF and the organic light shielding layer 14 from detection data of light detected via the blue filter BF.

Thus, only the blue detection data in the visible light region can be extracted by subtracting detection data of light detected by optically overlapping the blue filter BF and the organic light shielding layer 14 from detection data of light detected via the blue filter BF.

The above-described subtraction is performed, for example, by the processing unit 19. The optical sensor 28b generates detection data of light via the green filter GF. The optical sensor 28a generates detection data of light via the green filter GF and the organic pigment light shielding layer 14.

The detection data of the optical sensor 27b includes a photosensitive component for green color and a photosensitive component for the near infrared region. However, the processing unit 19 is able to extract detection data for only a green color component in the visible light region by subtracting the detection data of the optical sensor 27a from the detection data of the optical sensor 27b. By replacing the green filter GF with the red filter RF or the blue filter BF, detection data of the red color component in the visible light region or the blue color component in the visible light region can be extracted, respectively.

Figure 28:
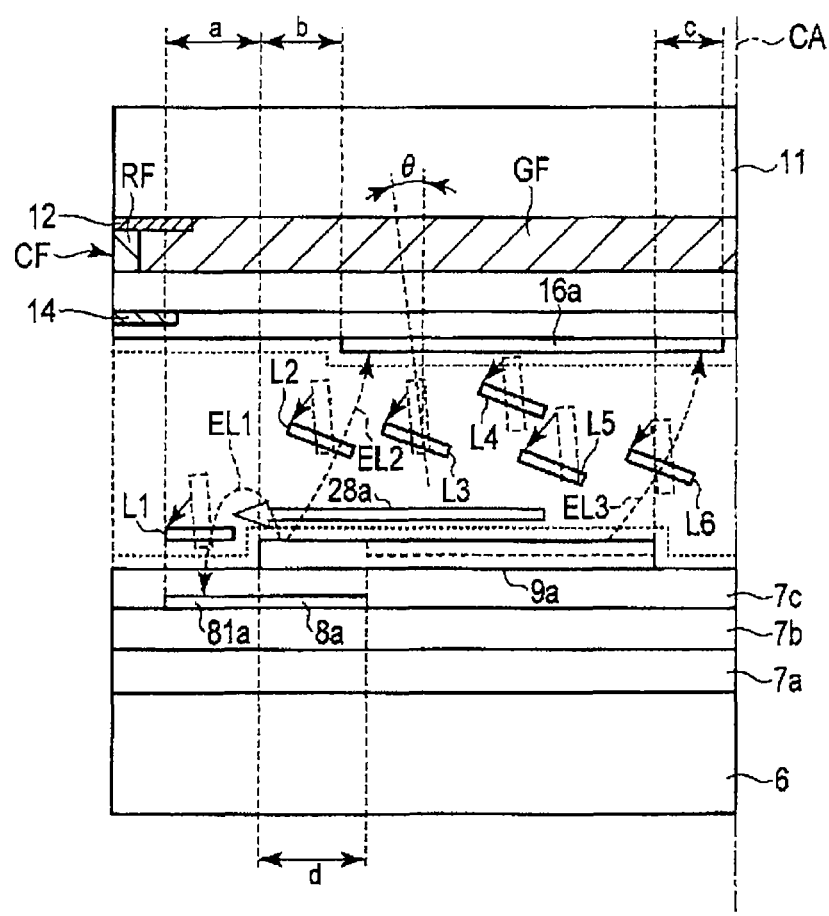
FIG. 28 is a partial cross sectional view showing an example of a left half portion of pixel in the horizontal direction according to the fourth embodiment.

FIG. 28 is a partial cross sectional view showing an example of a left half portion of pixel in the horizontal direction according to the present embodiment. FIG. 28 corresponds to left half portion of FIG. 16.

As shown in FIG. 28, the liquid crystal molecules L1 to L6 when the liquid crystal drive voltage is not applied to the pixel electrode 9a is vertically aligned with a small pre-tilt angle θ.

In the cross section of FIG. 28, the left end of the counter substrate 16a is offset by a width b with respect to the left end of the pixel electrode 9a towards the pixel center line CA and the right end of the counter electrode 16a is offset by a width c with respect to the right end of the pixel electrode 9a.

The left end of the common electrode 8a is offset by a width a with respect to the left end of the pixel electrode 9a towards a pixel side portion of the pixel opposite to the pixel electrode CA.

When the liquid crystal drive voltage is applied to the pixel electrode 9a, electric field represented by a line of electric force EL 1 is produced between the pixel electrode 9a and the common electrode 8a. Moreover, when the liquid crystal drive voltage is applied to pixel electrode 9a, an electric field represented by lines of electric force EL 2 and EL 3 extended obliquely between the pixel electrode 9a and the counter electrode 16a offset from a portion at which the pixel electrode 9a is formed.

The liquid crystal molecules L1 to L6 are inclined towards a direction 28a based on the oblique electric field. The liquid crystal molecules L7 to L12 in the right half of the pixel are inclined towards a direction 28b opposite to the direction 28a.

The liquid crystal molecule L1 located in a substantially strong electric field behaves most quickly, which will be a trigger in order to operate the liquid crystal display to be faster. The liquid crystal molecules L2 to L6 at a portion where the oblique electric field is produced behave quickly similar to the liquid crystal molecule L1. Hence, the liquid crystal molecules L2 to L6 accomplish a fast liquid crystal display operation in cooperation with the liquid crystal molecule L1.

The liquid crystal molecules L1 to L12 are inclined by the oblique electric field as described in the present embodiment, whereby liquid crystal molecules even having small pre-tilt angle can be driven as a liquid crystal molecule having substantially large pre-tilt angle. Accordingly, having the liquid crystal molecules L1 to L12 inclined by the oblique electric field, a fast liquid crystal display can be accomplished.

For example, the liquid crystal molecules L1 to L12 are inclined by the oblique electric field, whereby the liquid crystal molecules are able to behave fast even when the pre-tilt angle $\theta$ is small such as in a range approximately from 0.1 degrees to 0.9 degrees. In the liquid crystal display with vertical alignment, liquid crystal molecules having a large pre-tilt angle are likely to tilt, however, since light leakage occurs due to the large pre-tilt angle even if the display is in a black state, the contrast may decrease.

The liquid crystal display device 1 produces, in pixel sides neighboring along the longitudinal direction, an electric field extending from the pixel electrode 9a to the protruded portion a (corresponding to protruded portion 81a) of the common electrode 8a and makes the liquid crystal molecules incline towards the direction 28a. Producing the electric field and driving the liquid crystal according to the present embodiment is able to accomplish a display with uniformity in the pixel and high transmittance.

Figure 29:
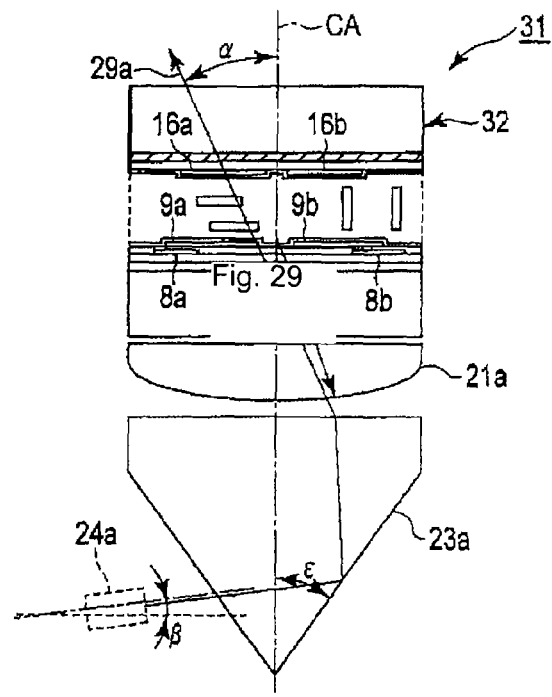
FIG. 29 is a partial cross sectional view showing an example of synchronization between a left-side pixel electrode in one pixel and a solid light emitting element.

FIG. 29 is a partial cross sectional view showing an example of synchronization between a left-side pixel electrode 9a in one pixel and a solid light emitting element 24a. Also, FIG. 29 shows a function for three dimensional displays using the semicircular lens 21a included in the optical control element 21 and the triangular prism 23a included in the optical control element 23.

In FIG. 29, a light path is exemplified when the liquid crystal drive voltage is applied to the pixel electrode 9a and the solid emitting element 24a is lit synchronizing to the application of the liquid crystal drive voltage. By applying the liquid crystal drive voltage to the pixel electrode 9a, the liquid crystal molecules in the left half portion of the pixel rotate to change from a vertical state to a horizontal state. The solid emitting element 24a is lit synchronizing to the application of the liquid crystal drive voltage to the pixel electrode 9a. The light emitted from the solid emitting element 24a passes through the triangular prism 23a and the semicircular lens 21a as shown FIG. 29 and is emitted as emitting light 29a, towards a direction of the right eye 30a. The emitting angle α can be set based on the apex angle ∈ of the triangular prism 23a, a curvature r of the semicircular lens 21a. For example, an amount of the apex angle ∈ of the triangular prism 23a is adjusted, whereby the emitted light of the solid emitting element 24a in the left side can be emitted towards a direction of the left eye 30a which is opposite.

Based on an image signal of the three dimensional image, a light-emission timing of the solid emitting elements 24a and 24b and a timing for applying voltage to the pixel electrodes 9a and 9b are synchronized so as to control the solid emitting elements 24a and 24b and the pixel electrodes 9a and 9b, and three dimensional display can be achieved.

Figure 30:
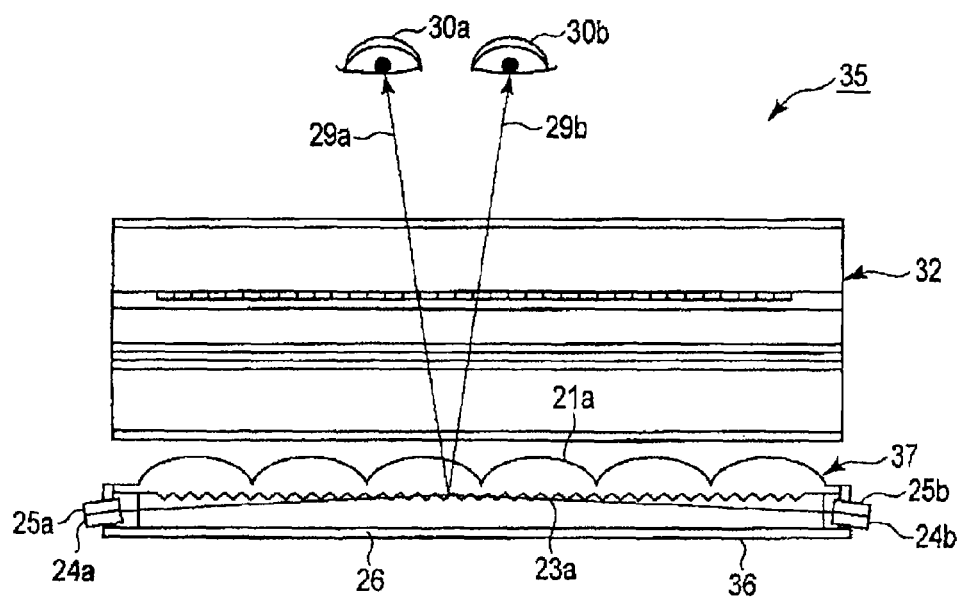
FIG. 30 is a cross sectional view showing a modification of the optical control element.

FIG. 30 is a cross-sectional view showing a modification of the optical control element.

The liquid crystal display device 35 includes a liquid crystal panel 32 and a backlight unit 36. The backlight unit 36 includes an optical control element 37, solid emitting elements 24a, 24b, 25a, and 25b and a reflection plate 26. The backlight unit 36 may include, for example, a diffusion plate, an optical guide plate, polarization separation film and retroreflective polarizing element which are omitted in FIG. 30.

Regarding the optical control element 37, an array of the semicircular lens 21a and an array of the triangular prism 23a are integrated by such as acrylic resin to form an integrated molding.

As for the optical control element 37, similar to FIG. 7, the axis of a plurality of triangular prism 23a has an angle φ with respect to axes of a plurality of semicircular lenses 21a in planar view.

Figure 31A:
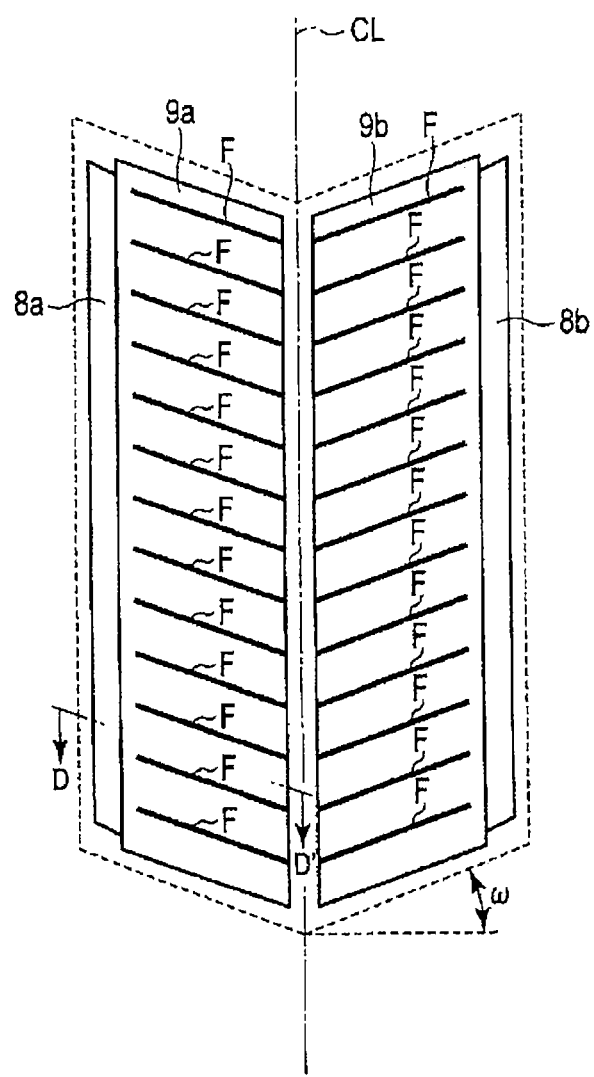
FIG. 31A is a pixel planar view showing a modification of a planar shape between a pixel electrode and a common electrode.
Figure 31B:
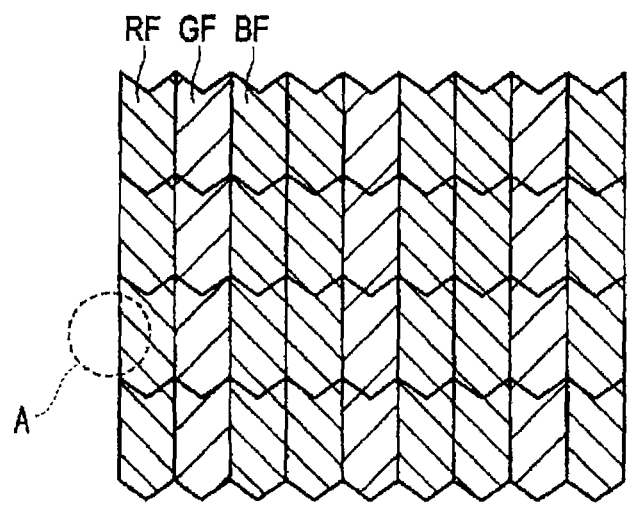
FIG. 31B is a pixel planar view showing a modification of a planar shape between a pixel electrode and a common electrode and an expanded planar view showing a red filter, a green filter and a blue filter which constitute the major portion in FIG. 31A.
Figure 31C:
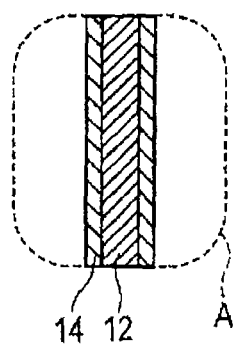
FIG. 31C is a pixel planar view showing a modification of a planar shape between a pixel electrode and a common electrode and an expanded planar view showing a portion illustrated by reference number A in FIG. 31B.

FIGS. 31A to 31C are pixel planar views showing a modification of a planar shape between a pixel electrodes 9a and 9b and a common electrodes 8a and 8b according to the present embodiment.

FIGS. 31A to 31C are partial planar views showing a modification of a shape of the pixel and a shape of the pixel electrodes. The cross section sectioned along line D-D' as shown in FIG. 31A is similar to that of FIG. 18.

The respective pixels having a V-shape have a V-shaped edge in the horizontal direction as an upper frame portion of the pixel and a V-shaped edge in the horizontal direction as lower frame portion of the pixel. The two V-shaped edges are parallel to each other. The respective pixels have two side edges which are parallel in the longitudinal direction. The respective pixels extend longer in the longitudinal direction than the horizontal direction. The shape of the respective pixels according to the present embodiment may be a reversed V-shape. In the horizontal direction, pixels having different colors are arranged. In the longitudinal direction, pixels having the same color are arranged. The pixels having the same color can be arranged in an oblique direction in planar view.

An angle ω is formed between the V-shaped edge and the horizontal direction. The angle ω may be in a range approximately from 5 degrees to 45 degrees in order to improve viewing angle. Further, in planar view, the alignment direction of the liquid crystal molecules L1 to L12 may be set to be the same as the direction of the V-shaped upper edge and lower edge.

The pixel electrodes 9a and 9b are formed to have a shape along a V-shaped pixel. The pixel electrodes 9a and 9b has a shape with line symmetry with respect to the pixel center line CL. A plurality of striped-shape patterns F are formed along a V-shaped edge on the surface of the pixel electrodes 9a and 9b.

In the present embodiment as described above, the quality of the color display of three dimensional image can be improved and three dimensional color display and a two dimensional color display can be exchanged. A bright color display can be accomplished.

Fifth Embodiment

In the present embodiment, materials such as a transparent resin and an organic pigment used for the counter substrate 4, 43 according to the first embodiment to the fourth embodiment are exemplified.

The photosensitive colored composite used for forming the carbon pigment light shielding layer 12, the organic pigment light shielding layer 14 and the color filter CF contains, in addition to the pigment dispersion (hereinafter, referred to paste), polyfunctional monomer, photosensitive resin or non-photosensitive resin, polymerization initiator and solvent. For example, an organic resin having high transparency such as photosensitive resin or non-photosensitive resin used in the present embodiment is collectively called transparent resin.

As a transparent resin, thermoplastic resin, thermosetting resin or photosensitive resin can be employed. As a thermoplastic resin, for example, butyral resin, styrene-maleic acid copolymer, chlorinated polyethylene, chlorinated polypropylene, polyvinyl chloride, polyvinyl chloride-vinyl acetate copolymer, polyvinyl acetate, polyurethane resin, polyester resin, acrylic resin, alkyd resin, polystyrene resin, polyamide resin, rubber based resin, cyclized rubber based resin, cellulose compounds, polybutadiene, polyethylene, polypropylene and polyimide resin may be employed. As a thermosetting resin, for example, epoxy resin, benzoguanamine resin, rosin-modified maleic acid resin, rosin-modified fumaric acid resin, melamine resin, urea resin and phenol resin can be employed. The thermosetting resin may be generated by reacting melamine resin with a compound containing an isocyanate group.

<Alkali-Soluble Resin>

To form light shielding films such as the carbon pigment light shielding layer 12 and the organic pigment light shielding layer 14, the first transparent resin layer 13, the second transparent resin layer 15 and the color filter CF according to the present embodiment, a photosensitive resin composite capable of pattern-forming by a photolithography may be employed. The above-described transparent resin may preferably be resin to which alkali-soluble property is applied. As an alkali-soluble resin, a resin containing carboxyl group or hydroxyl group may be used or other resin may be used. As an alkali-soluble resin, for example, epoxy acrylate based resin, novolac based resin, polyvinyl phenol resin, acrylic resin, epoxy resin containing carboxyl group, urethane resin containing carboxyl group may be employed. Among the above-described resin, as an alkali-soluble resin, the epoxy acrylate based resin, the novolac based resin and the acrylic resin may preferably be used. In particular, the epoxy acrylate based resin or the novolac based resin is preferable.

<Acrylic Resin>

As representative examples of the transparent resin according to the present embodiment, the following acrylic resin is exemplified.

As acrylic resin, a polymer acquired by using monomer can be used. The monomer includes, for example, (meth) acrylic acid; alkyl (meth) acrylate such as methyl (meth) acrylate, ethyl (meth) acrylate, propyl (meth) acrylate, butyl (meth) acrylate, t-butyl (meth) acrylate, benzyl (meth) acrylate and lauryl (meth) acrylate; hydroxyl-group-contained (meth) acrylate such as hydroxyethyl (meth) acrylate and hydroxypropyl (meth) acrylate; aclicyclic (meth) acrylate such as cyclohexyl (meth) acrylate, isobornyl (meth) acrylate and dicyclopentenyl (meth) acrylate.

The monomers exemplified as above can be used individually or two or more types of monomers can be used.

Further, the acrylic resin may be produced by using styrene, cyclohexylmaleimide which are capable of copolymerization with the above monomers, or copolymer containing compound such as phenylmaleimide. For example, by performing a reaction between copolymer acquired by copolymerization of carboxylic acid having an ethylenically unsaturated group such as (meth) acrylic acid and a composite containing epoxy group such as glycidyl methacrylate and unsaturated double bond, resin having photosensitivity may be produced so as to obtain the acrylic resin. For example, a carboxylic-acid containing composite such as acrylic acid may be added to a polymer of epoxy (meth) acrylate such as glycidyl methacrylate or a copolymer of this polymer and other (meth) acrylate, thereby producing resin having photosensitivity, and then acrylic resin is obtained.

<Organic Pigment>

As a red pigment, for example, C.I. Pigment Red 7, 9, 14, 41, 48:1, 48:2, 48:3, 48:4, 81:1, 81:2, 81:3, 97, 122, 123, 146, 149, 168, 177, 178, 179, 180, 184, 185, 187, 192, 200, 202, 208, 210, 215, 216, 217, 220, 223, 224, 226, 227, 228, 240, 242, 246, 254, 255, 264, 272, 279 etc. can be used.

As a yellow pigment, for example, C.I. Pigment Yellow 1, 2, 3, 4, 5, 6, 10, 12, 13, 14, 15, 16, 17, 18, 20, 24, 31, 32, 34, 35, 35:1, 36, 36:1, 37, 37:1, 40, 42, 43, 53, 55, 60, 61, 62, 63, 65, 73, 74, 77, 81, 83, 86, 93, 94, 95, 97, 98, 100, 101, 104, 106, 108, 109, 110, 113, 114, 115, 116, 117, 118, 119, 120, 123, 125, 126, 127, 128, 129, 137, 138, 139, 144, 146, 147, 148, 150, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 199, 213, 214 etc. can be used.

As a blue pigment, for example, C.I. Pigment Blue 15, 15:1, 15:2, 15:3, 15:4, 15:6, 16, 22, 60, 64, 80 etc. can be used. Among these pigments, C.I. Pigment Blue 15:6 is desirable.

As a violet pigment, for example, C.I. Pigment Violet 1, 19, 23, 27, 29, 30, 32, 37, 40, 42, 50 etc. can be used. Among these pigments, C.I. Pigment Violet 23 is desirable.

As a green pigment, for example, C.I. Pigment Green 1, 2, 4, 7, 8, 10, 13, 14, 15, 17, 18, 19, 26, 36, 45, 48, 50, 51, 54, 55, 58 and etc. can be used. Among these pigments, C.I. Pigment Green 58 which is zinc halide phthalocyanine green pigment is desirable. As a green pigment, aluminum halide phthalocyanine pigment may be used.

<Color Material for Carbon Pigment Light Shielding Layer 21 and Organic Pigment Light Shielding Layer 14>

The light shielding color material contained in the carbon pigment light shielding layer 12 and the organic pigment light shielding layer 14 has absorbability in the visible light wavelength region and light shielding function. For the light shielding color material according to the present embodiment, for example, organic pigment, inorganic pigment, dye or the like can be used. As an inorganic pigment, for example, carbon black, titanium oxide or the like can be used. As dye stuffs, azo dye, anthraquinone dye, phthalocyanine dye, quinonimine dye, quinoline dye, nitro dye, carbonyl dye, methane dye or the like can be used. As for the organic pigment, for example, the above-described organic pigment may be implemented. As a light shielding component, a single light shielding component may be employed or two or more light shielding pigment components may be combined with appropriate ratio.

For example, the visible wavelength region ranges from approximately light wavelength 400 nm to 700 nm.

<Example of Black Resist 1 Applied to Carbon Pigment Light Shielding Layer 12>

A preparation example of the black paste used for the carbon pigment light shielding layer 12 is described.

The mixture having the following composition is stir-mixed uniformly and stirred by a bead mill dispersing machine so as to produce the black paste. Each of the composition is expressed by pts. mass.

carbon pigment 20 pts.
dispersing agent 8.3 pts.
copper phthalocyaine derivative 1.0 pts.
propylene glycol monomethyl ether acetate 71 pts.

By using the above-described black paste, the mixture having the following composition is stir-mixed uniformly and filtered by a 5 μm filter, whereby the black resist 1 is prepared to be applied to the carbon pigment light shielding layer 12. It is noted that the resist represents a photosensitive colored composite containing carbon or organic pigment.

black paste 25.2 pts.
acrylic resin paste solution 18 pts.
dipenta pentaerythritol and hexa-acrylate 5.2 pts.
photoinitiator 1.2 pts.
sensitizer 0.3 pts.
leveling agent 0.1 pts.
cyclohexanone 25 pts.
propylene glycol monomethyl ether acetate 25 pts.

In the present embodiment and the above-described embodiments, the main constituent of the color material (pigment) in the black resist 1 or color resist represents a color material accounting for more than or equal to 50% with respect to the ratio (%) of the total mass of the color material contained in the resist. For example, in the black resist 1, carbon accounts for 100% of the color material so that the carbon is determined as the major color material. Also, in black resist of which the major color material is carbon pigment, in order to adjust the tone of color or the reflected color, organic pigments such as red, yellow and blue may be added with a ratio of the total mass equal to or less than 10%.

<Example of Black Resist 2 Applied to Organic Pigment Light Shielding Layer 14>

A wavelength at which the transmittance of the organic pigment light shielding layer 14 according to the present embodiment rises in a long wavelength side which is more than or equal to 670 nm (wavelength at which the transmittance rises in this rising becomes 50% of the transmittance is hereinafter referred to half-value wavelength) is within a region from light wavelength about 670 nm to 800 nm. Here, the light wavelength about 670 nm is a light wavelength at which the transmittance of red filter RF is maintained high and the light wavelength about 800 nm corresponds to a rising portion at which the transmittance of the blue filter BF becomes high.

Hereinafter, a mixture example of an organic pigment used for the organic pigment light shielding layer 14 is described.

C.I. pigment red 254 (hereinafter abbreviated as R254)
C.I. pigment yellow 139 (hereinafter abbreviated as Y139)
C.I. pigment violet 23 (hereinafter abbreviated as V23)

Among these three types of pigments, pigment of R 254 may be omitted. Further, other than these three types of pigments, a small amount of other type of pigment for adjusting half-value wavelength, for example, the above-described pigments with amount of 20% or less may be added thereto.

For example, a small amount of green pigments such as halogenated copper phthalocyanine, halogenated zinc phthalocyanine, or halogenated aluminum phthalocyanine may be used to adjust a rising of the spectral characteristic around light wavelength 700 nm in the light shielding layer BLK2 (adjusting a shape of spectrum curve). Adjusting the rising of the spectrum characteristic, optimized infrared region transparency can be applied to the light shielding layer BLK2. Alternatively, a pigment having 760 nm of half-value wavelength in the infrared region such as C.I. pigment blue 15:3 is applied to an organic pigment used for the light shielding layer BLK2, for example, with an amount 10% or less, whereby the half-value wavelength of BLK2 can be shifted to a long wavelength side which is longer than 680 nm as shown in FIGS. 6 and 24. When blue pigment such as pigment blue 15:3 is added to an organic pigment used for the light shielding layer BLK2, an amount corresponding to the violet pigment V23 can be reduced. A paste in which single pigment having half-value wavelength at 700 nm or more is dispersed (e.g., dispersion of single pigment, transparent resin and organic solvent) is added to the black resist 2, whereby the half-value wavelength can be adjusted to a long wavelength side which is 700 nm or more.

The organic pigment light shielding layer 14 may preferably have a transmittance in the visible light region of 5% or less. The visible light region usually has light wavelength ranging approximately from 400 nm to 700 nm. In order to set the half-value wavelength of the organic pigment light shielding layer 14 to be within a light wavelength range from approximately 670 nm to 750 nm, the infrared light transmittance properties should rise around light wavelength 660 nm and the transmittance properties at the long wavelength side should be high. A wavelength range of low transmittance of the organic pigment light shielding layer 14 may be in a light wavelength ranging from approximately 400 nm to 650 nm. The transmittance of the organic pigment light shielding layer 14 of a low value, e.g., 5% or less in the light wavelength ranging approximately from 400 nm to 650 nm can be set extremely easily by increasing an amount of pigment contained in the organic pigment light shielding layer 14 or setting the film thickness of the organic pigment light shielding layer 14 to be thicker. Similarly, a wavelength position of the half-value wavelength can readily be adjusted based on an amount of pigment, composition ratio of a violet pigment, a green pigment, yellow pigment and a red pigment (described later), and the thickness of the organic pigment light shielding layer 14. As a green pigment applied for the organic pigment light shielding layer 14, various green pigments which are described later can be applied. In order to set the half-value light wavelength of the organic pigment light shielding layer 14 to be within a light wavelength range from 670 nm to 750 nm, it is preferable to use a green pigment in which rising of the transmittance of the infrared light (e.g., half-value wavelength) is within a light wavelength range from 700 nm to 800 nm. An adjustment for setting the half-value wavelength to be in a light wavelength range from 670 nm to 750 nm can be achieved based on mainly the violet pigment and the green pigment. To adjust dispersion characteristics of the organic pigment light shielding layer 14, a blue pigment may be added.

The mass ratio (%) of R254 may be, for example, within a range from 0 to 40%.

The mass ratio (%) of Y139 may be, for example, within a range from 25 to 50%.

The mass ratio (%) of V23 may be, for example, within a range from 30 to 75%.

In a standard film thickness of the organic pigment light shielding layer 14, e.g., film thickness around 2 μm, V23 violet pigment is added with any value in a range from 30% to 75%. Thus, the organic pigment light shielding layer 14 has a half-value wavelength in the light wavelength from 670 nm to 800 nm. By setting the yellow organic pigment to be in a range from 25% to 50%, adding 0 to 40% amount of red organic pigment with 0 to 40%, and then mixing them, the transmittance of the light of wavelength 400 nm to 660 nm of the organic pigment light shielding layer 14 can be sufficiently lowered. In the light wavelength range from 440 nm to 660 nm, an uplift of the transmittance of the organic pigment light shielding layer 14 (spectral uplift with respect to 0% base line) is removed so as to enable accurate color separation by subtracting the detection data of the optical sensor 27a from the detection data of the optical sensor 27b.

Normally, before color resist (colored composition) is generated based on these pigments, the pigment is dispersed to resin or solution and pigment paste (dispersion) is produced. For example, to disperse simple substance of pigment Y139 into resin or solution, the following material is mixed to 7 pts. of pigment Y139 (pts. mass).

acrylic resin solution (solid content 20%): 40 pts.
 dispersing agent: 0.5 pts.
 cyclohexanone: 23.0 pts.

It is noted that other pigments such as V23 or R254 may be dispersed to the same resin or solution so as to produce a black pigment dispersion paste.

Hereinafter, the composition ratio for producing the black resist based on the above-described pigment dispersion paste is exemplified as follows.

Y139 paste: 14.70 pts.
 V23 paste: 20.60 pts.
 acrylic resin solution: 14.00 pts.
 acrylic monomer: 4.15 pts.
 initiator: 0.7 pts.
 sensitizer: 0.4 pts.
 cyclohexanone: 27.00 pts.
 PGMAC: 10.89 pts.

By using the above-described composition ratio, a black resist 2 used for the organic pigment light shielding layer 14 is formed.

The black resist 2 which is the main color material of pigment used for forming the organic pigment light shielding layer 14 is violet pigment 23 that accounts for 58% with respect to the ratio of the total mass. Most of the organic pigments have high transmittance in a long wavelength region longer than a light wavelength of 800 nm.

For example, the major color material of the black resist contained in the organic pigment light shielding layer 14 may be 100% of organic pigment. For example, to adjust light shielding properties, carbon pigment may be added to black resist having organic pigment as a major color material, to be 40% or less of total mass.

<Example of Red Resist Used for Counter Substrate 33>

An example of preparing red paste (dispersion liquid) is described as follows.

The mixture having the following composition is stir-mixed uniformly, dispersed for 5 hours by a sand mill using glass beads of 1 mm in diameter and filtered by an approximately 5 μm filter, thereby producing the red paste.

red pigment C.I. Pigment Red 254: 8 pts.
 red pigment C.I. Pigment Red 177: 10 pts.
 yellow pigment C.I. Pigment Yellow 150: 2 pts.
 dispersion: 2 pts.
 acrylic varnish (containing solid content of 20 mass %): 108 pt.

<Preparing Red Resist>

After preparing the red paste, the mixture having the following composition is stir-mixed to be uniform, and filtered by a filter of approximately 5 μm, thereby producing the red resist.

red paste: 42 pts.
 acrylic resin solution: 18 pts.
 dipenta pentaerythritol and hexa-acrylate: 4.5 pts.
 photoinitiator: 1.2 pts.
 sensitizer: 2.0 pts.
 cyclohexanone: 32.3 pts.

<Example of Green Resist Used for Counter Substrate 33>
<Preparing Green Paste>

The mixture having the following composition is stir-mixed uniformly, dispersed for 5 hours by a sand mill using glass beads of 1 mm in diameter and filtered by a filter of approximately 5 μm, thereby producing the green paste (dispersion liquid).

green pigment C.I. Pigment Green 58: 10.4 pts.
 yellow pigment C.I. Pigment Yellow 150: 9.6 pts.
 dispersion: 2 pts.
 acrylic varnish (containing solid content of 20 mass %): 66 pts.

<Preparing Green Resist>

After preparing the green paste, the mixture having the following composition is stir-mixed to be uniform, and filtered by an approximately 5 μm filter, thereby producing the green resist.

green paste: 46 pts.
 acrylic resin solution: 8 pts.
 dipenta pentaerythritol and hexa-acrylate: 4 pts.
 photoinitiator: 1.2 pts.
 photoinitiator: 3.5 pts.
 sensitizer: 1.5 pts.
 cyclohexanone: 5.8 pts.
 propylene glycol monomethyl ether acetate 30 pts.

<Example of Blue Resist Used for Counter Substrate 33>
<Preparing Blue Paste 1>

The mixture having the following composition is stir-mixed uniformly, dispersed for 5 hours by a sand mill using glass beads of 1 mm in diameter and filtered by a filter of approximately 5 μm, thereby producing the blue paste 1.

blue pigment C.I. Pigment Blue 15:6:52 pts.
 dispersion: 6 pts.
 acrylic varnish (containing solid content of 20 mass %): 200 pts.

<Preparing Blue Paste 2>

The mixture having the following composition is stir-mixed uniformly, dispersed for 5 hours by a sand mill using glass beads of 1 mm in diameter and filtered by an approximately 5 μm filter, thereby producing intermediate blue paste.

blue pigment C.I. Pigment Blue 15:6: 49.4 pts.
 dispersion: 6 pts.
 acrylic varnish (containing solid content of 20 mass %): 200 pts.

The blue paste 2 is prepared by adding the following violet dye powder to the intermediate blue paste and mixing them well.

violet dye 2.6 pt.

<Preparing Blue Resist>

After preparing the blue paste 1, the mixture having the following composition is stir-mixed to be uniform, and filtered by an approximately 5 μm filter, thereby producing the blue resist.

blue paste: 16.5 pts.
 acrylic resin solution: 25.3 pts.
 dipenta pentaerythritol and hexa-acrylate: 1.8 pts.
 photoinitiator: 1.2 pts.
 sensitizer: 0.2 pts.
 cyclohexanone: 25 pts.
 propylene glycol monomethyl ether acetate 30 pts.

<Producing Counter Substrate 33>

The above-described three colors of red resist, green resist and blue resist are combined and the counter substrate 33 is produced by, for example, a manufacturing method described in the third embodiment.

In the liquid crystal display device according to the embodiments of the present invention, not only a three dimensional display but also a high-resolution two dimensional display can be performed. Therefore, the liquid crystal display device according to the embodiments of the present invention can be applied in various ways. The liquid crystal display device according to the present invention can be applied to, for example, cellular phones, portable game devices, portable information terminals, personal computers, digital books, camcorders, digital still cameras, head-mounted displays, navigation systems, acoustic reproduction apparatuses (e.g., car audio, digital audio player, etc.), copying machines, facsimiles, printers, printer and composite machines, vending machines, automatic teller machines (ATMs), personal authentication equipment, optical communication equipment etc.

The above-described embodiments can be modified in various ways without departing scope of the present invention. The above-described embodiments can be combined in various ways to be implemented.

An object of the present invention is to provide a liquid crystal display device capable of displaying bright two dimensional displays or three dimensional displays, a substrate for a liquid crystal display device and a manufacturing method of a substrate for a liquid crystal display device.

A liquid crystal display device according to a first aspect of the present invention includes: an array substrate provided with liquid crystal drive elements, forming a plurality of polygonal pixels including side edge portions, and having two pixel electrodes in a polygonal pixel, arranged to have line symmetry with respect to a pixel center line that divides the plurality of polygonal pixels in a longitudinal direction; a liquid crystal layer; a counter substrate including a first transparent substrate, a first light shielding layer formed on the first transparent substrate to form a plurality of openings corresponding to a plurality of polygonal pixels in a planar view and located at the side edge portions, a transparent resin layer formed on the first transparent substrate upon which the first light shielding layer is formed and a second light shielding layer formed on the transparent resin layer; and a backlight unit provided at an opposite side of a portion at which the liquid crystal layer of the array substrate is arranged. The counter substrate faces the array substrate via the liquid crystal layer.

The polygonal pixels have a polygonal shape in which at least two edges thereof are parallel in a planar view. A center line extended in a direction where a first linear pattern included in the first light shielding layer extends and a center line extended in a direction where a second linear pattern included in the second light shielding layer extends are overlapped at the side edge portions in a planar view and a line width of the first linear pattern and a line width of the second linear pattern are different from each other.

In the liquid crystal display device according to the first aspect of the present invention, the array substrate may preferably include: a second transparent substrate; a plurality of common electrodes arranged in line symmetry with respect to the pixel center line; and an insulation layer formed on the second transparent substrate on which the plurality of common electrodes are formed. The two pixel electrodes may preferably be formed on the insulation layer, and the common electrodes may preferably be protruded towards outside the side edge portions of the polygonal pixels from the two pixel electrodes, in a planar view.

In the liquid crystal display device according to the first aspect of the present invention, the backlight unit may preferably be an edge-light type backlight unit, and the liquid crystal display device may preferably further include a light emission processing unit that synchronizes a timing at which voltage is applied to the pixel electrodes so as to drive liquid crystal molecules in the liquid crystal layer and a light emission timing of the backlight unit, thereby controlling the pixel electrodes and the backlight unit.

In the liquid crystal display device according to the first aspect of the present invention, the liquid crystal display device may preferably further include: an angle control unit that controls an angle of light emitted from the backlight unit; and an optical control element that adjusts an emitting angle of an emitting light emitted from a liquid crystal display.

In the liquid crystal display device according to the first aspect of the present invention, the backlight unit may preferably include a first solid emitting element that emits visible light and a second solid emitting element that emits infrared light. Moreover, the array substrate may preferably further include: a first optical sensor used for detecting visible light; a second optical sensor used for detecting infrared light; and a detection processing unit that synchronizes a light emission timing of the second solid emitting element and a detection timing of the second optical sensor so as to control the second solid emitting element and the second optical sensor and changes, based on a detection data of the second optical sensor, an angle of light emitted from the first solid emitting element.

In the liquid crystal display device according to the first aspect of the present invention, the second optical sensor may preferably be a silicon photo diode.

In the liquid crystal display device according to the first aspect of the present invention, the liquid crystal drive elements may preferably be thin film transistors each including a channel layer that contains two or more types of metal oxide from among gallium, indium, zinc, tin, hafnium, yttrium and germanium and electrically connected to the two pixel electrodes.

In the liquid crystal display device according to the first aspect of the present invention, any of a red filter, a green filter and a blue filter may preferably be arranged corresponding to each of the plurality of openings in the counter substrate.

In the liquid crystal display device according to the first aspect of the present invention, the second light shielding layer may preferably have a transmittance characteristics in which a transmittance is maintained to be low at low wavelength, showing high transmittance in a region of light wavelength longer than approximately 680 nm or longer than approximately 800 nm; and the counter substrate may preferably include a portion in which the second light shielding layer and any of the red filter, the green filter and the blue are overlapped in a planar view and the array substrate may preferably further includes a compensation optical sensor that detects light incoming to the portion overlapped.

In the liquid crystal display device according to the first aspect of the present invention, liquid crystal molecules of the liquid crystal layer may preferably have negative dielectric anisotropy and an initial alignment may preferably be in a direction perpendicular to a surface of a substrate.

According to a substrate for liquid crystal display device of a second aspect of the present invention, in a substrate for liquid crystal display device which is used for the liquid crystal display device according to the above-described first aspect, the substrate includes: a transparent substrate; a first light shielding layer formed on the transparent substrate to form a plurality of openings corresponding to a plurality of polygonal pixels in a planar view; a transparent resin layer formed on the transparent substrate on which the first light shielding layer is formed; and a second light shielding layer formed on the transparent resin layer. The polygonal pixels have a polygonal shape in which at least two edges thereof are parallel in a planar view. A center line extended in a direction where a first linear pattern included in the first light shielding layer extends and a center line extended in a direction where a second linear pattern included in the second light shielding layer extends are overlapped in a planar view, and a line width of the first linear pattern and a line width of the second linear pattern are different from each other. The first light shielding layer is a carbon pigment light shielding layer containing carbon pigment as a principal component of a light shielding color material and the second light shielding layer is an organic pigment light shielding layer containing a plurality of organic pigments as a principal component of a light shielding color material.

In the substrate for liquid crystal display device of a second aspect of the present invention, any of a red filter, a green filter and a blue filter may preferably be arranged corresponding to each of the plurality of openings in the counter substrate.

In the substrate for liquid crystal display device of a second aspect of the present invention, the counter substrate may preferably include a portion in which the second light shielding layer and any of the red filter, the green filter and the blue are overlapped in a planar view.

A manufacturing method of a liquid crystal display substrate according to a fourth aspect of the present invention includes steps of: coating, on a transparent substrate, a first black resist containing carbon pigment as a principal component of light shielding color material; exposing the first black resist via a photo mask used for patterning the first black resist, thereby forming a first light shielding layer and alignment marks, the first a light shielding layer forming a plurality of openings corresponding to a plurality of polygonal pixels in a planar view; forming a color filter at the plurality of openings, to which a red filter, a blue filter and a green filter are assigned; forming a transparent resin layer on the color filter; coating, on the transparent resin layer, a second black resist containing an organic pigment as a principal component of light shielding color material and light shielding material containing at least C.I. Pigment Violet 23 as an organic pigment; recognizing a position of the alignment marks by using infrared light and an infrared light sensor; aligning a position of a photomask used for a patterning of the second black resist with a position of the transparent substrate based on the position of the alignment marks; exposing the second black resist via the photo mask which is aligned, thereby shaping the second light shielding layer; and forming an organic pigment light shielding layer containing an organic pigment as a principal component of light shielding color material.

According to an aspect of the present invention, a liquid crystal display device capable of displaying bright two dimensional displays or three dimensional displays, a substrate for a liquid crystal display device and a method of manufacturing a substrate for liquid crystal display device can be provided.

DESCRIPTION OF REFERENCE NUMERALS 1, 11, 31, 35: liquid crystal display device
2, 32: liquid crystal panel
3: array substrate
4, 33: counter substrate
5: liquid crystal layer
6: transparent substrate
7a to 7c: insulation layer
8a, 8b: common electrode
9a, 9b: pixel electrode
10, 17: alignment film
12: carbon pigment light shielding layer
13: first transparent resin layer
14: organic pigment light shielding layer
15: second transparent resin layer
16a, 16b: counter electrode
18a, 18b: liquid crystal drive element
19: processing unit
20a, 20b: polarizing plate
21, 23, 37: optical control element
22, 36: backlight unit
24a, 24b, 25a, 25b: solid light emitting element
26: reflection plate
27, 27a, 27b: optical sensors
34: color filter layer
50a, 51a: angle control unit
CF: color filter
RF: red filter
GF: green filter
BF: blue filter Obviously, numerous modifications and variations of the present invention are possible in light of the above teachings. It is therefore to be understood that within the scope of the appended claims, the invention may be practiced otherwise than as specifically described herein.

What is claimed is:

1. A liquid crystal display device, comprising:
an array substrate;
a liquid crystal layer;
a counter substrate facing the array substrate via the liquid crystal layer; and
a backlight unit provided on a back side of the array substrate opposite to a side where the liquid crystal layer is formed, wherein
the array substrate has a plurality of polygonal pixels including side edge portions and has two pixel electrodes in a polygonal pixel positioned to have line symmetry with respect to a pixel center line that divides the plurality of polygonal pixels in a longitudinal direction,
the counter substrate includes
a first transparent substrate,
a first light shielding layer formed on the first transparent substrate,
a transparent resin layer formed on the first transparent substrate, and
a second light shielding layer formed on the transparent resin layer,
the first light shielding layer has a plurality of openings formed in the side edge portions and corresponding to the plurality of polygonal pixels having a polygonal shape in which at least two edges thereof are parallel in a planar view,
the first light shielding layer includes a first linear pattern having a center line in a direction along which the first linear pattern is extended,
the second light shielding layer includes a second linear pattern having a center line in a direction along which the second linear pattern is extended,
the first and second linear patterns are formed such that the center line of the first linear pattern overlaps with the center line of the second linear pattern in the side edge portions in a planar view, and that the first linear pattern has a line width that differs from a line width of the second linear pattern within a range of 0.5 μm to 10 μm, and the backlight unit includes a first solid emitting element configured to emit a visible light and a second solid emitting element configured to emit an infrared light, and the array substrate further includes
- a first optical sensor configured to detect the visible light,
- a second optical sensor configured to detect the infrared light, and
- a detection processor configured to synchronize a light emission timing of the second solid emitting element and a detection timing of the second optical sensor, and change an angle of light emitted from the first solid emitting element based on data detected by the second optical sensor.

2. The liquid crystal display device according to claim 1, wherein
the array substrate includes
- a second transparent substrate,
- a plurality of common electrodes positioned in line symmetry with respect to the pixel center line, and
- an insulation layer formed on the second transparent substrate on which the plurality of common electrodes are formed,
the two pixel electrodes are formed on the insulation layer, and
the common electrodes protrude towards outside the side edge portions of the polygonal pixels from the two pixel electrodes in a planar view.

3. The liquid crystal display device according to claim 1, wherein the backlight unit is an edge-light type backlight unit, and a light emission processor is configured to synchronize a timing at which a voltage is applied to the two pixel electrodes and a light emission timing of the backlight unit.

4. The liquid crystal display device according to claim 1, further comprising:
- an angle control unit configured to control the angle of the light emitted from the backlight unit, and
- an optical control element configured to adjust an emitting angle of an emitting light emitted from a liquid crystal display.

5. The liquid crystal display device according to claim 1, wherein the second optical sensor is a silicon photo diode.

6. The liquid crystal display device according to claim 1, wherein the array substrate includes liquid crystal drive elements which are thin film transistors each of which is electrically connected to the two pixel electrodes and includes a channel layer comprising an oxide of metals selected from the group consisting of gallium, indium, zinc, tin, hafnium, yttrium and germanium.

7. The liquid crystal display device according to claim 1, wherein one of a red filter, a green filter and a blue filter is positioned in correspondence to each of the plurality of openings in the counter substrate.

8. The liquid crystal display device according to claim 7, wherein the counter substrate includes an overlap portion in which the second light shielding layer overlaps with one of the red filter, the green filter and the blue filter in a planar view, and the array substrate further includes a compensation optical sensor configured to detect incoming light via the overlap portion.

9. The liquid crystal display device according to claim 1, wherein a liquid crystal molecule in the liquid crystal layer has negative dielectric anisotropy and has an initial alignment in a direction perpendicular to a surface of the substrate.

10. A substrate for a liquid crystal display device, comprising:
a transparent substrate;
a first light shielding layer formed on the transparent substrate and having a plurality of openings corresponding to a plurality of polygonal pixels in a planar view;
a transparent resin layer formed on the transparent substrate on which the first light shielding layer is formed; and
a second light shielding layer formed on the transparent resin layer, wherein
the polygonal pixels each have a polygonal shape in which at least two edges thereof are parallel in a planar view,
the first light shielding layer includes carbon pigment as a principal component of light shielding color material,
the second light shielding layer includes at least one organic pigment as a principal component of light shielding color material,
the first light shielding layer includes a first linear pattern having a center line in a direction along which the first linear pattern is extended,
the second light shielding layer includes a second linear pattern having a center line in a direction along which the second linear pattern is extended, and
the first and second linear patterns are formed such that the center line of the first linear pattern overlaps with the center line of the second linear pattern in a planar view, and that the first linear pattern has a line width that is smaller than a line width of the second linear pattern within a range of 0.5 μm to 10 μm.

11. The substrate according to claim 10, wherein one of a red filter, a green filter and a blue filter is positioned in correspondence to each of the plurality of openings in the first light shielding layer.

12. The substrate according to claim 11, wherein the first light shielding layer includes a portion in which the second light shielding layer overlaps with one of the red filter, the green filter and the blue in a planar view.

13. A method of manufacturing a liquid crystal display substrate, comprising:
forming, on a transparent substrate, at least one alignment mark and a first light shielding layer having a plurality of openings corresponding to a plurality of polygonal pixels in a planar view, the forming comprising coating a first black resist on the transparent substrate and exposing the first black resist via a photomask;
forming a color filter including a red filter, a blue filter and a green filter in the plurality of openings;
forming a transparent resin layer on the color filter;
coating a second black resist on the transparent resin layer;
detecting a position of the at least one alignment mark by infrared light;
aligning a position of a photomask and a position of the transparent substrate based on the position of the at least one alignment mark; and
forming an organic pigment light shielding layer, wherein
the first black resist includes carbon pigment as a principal component of light shielding color material, and the second black resist includes an organic pigment as a principal component of light shielding color material and includes C.I. Pigment Violet 23, and
the first light shielding layer includes a first linear pattern having a center line in a direction along which the first linear pattern is extended, the organic pigment light shielding layer includes a second linear pattern having a center line in a direction along which the second linear pattern is extended, and the first and second linear patterns are formed such that the center line of the first linear pattern overlaps with the center line of the second linear pattern in a planar view, and that the first linear pattern has a line width that is smaller than a line width of the second linear pattern within a range of 0.5 μm to 10 μm.

14. The liquid crystal display device according to claim 1, wherein the line width of the first linear pattern is less than the line width of the second linear pattern.

15. The liquid crystal display device according to claim 1, wherein
the second light shielding layer is disposed between the first light shielding layer and the backlight unit, and
the difference between the line widths of the first and second linear patterns is set such that light emitting directions of light emitted from the backlight unit at the side edge portions are angled away from the pixel center line and correspond to a right eye and a left eye, respectively, of an observer.

16. The liquid crystal display device according to claim 1, wherein the difference between the line width of the first linear pattern and the line width of the second linear pattern is within a range of 0.5 μm to 2 μm.

17. The substrate according to claim 10, wherein the difference between the line width of the first linear pattern and the line width of the second linear pattern is within a range of 0.5 μm to 2 μm.

18. The substrate according to claim 10, wherein the difference between the line widths of the first and second linear patterns is set such that light emitting directions of light emitted from a backlight unit are angled away from a pixel center line and correspond to a right eye and a left eye, respectively, of an observer.

19. The method according to claim 13, wherein the difference between the line widths of the first and second linear patterns is set such that light emitting directions of light emitted from a backlight unit are angled away from a pixel center line and correspond to a right eye and a left eye, respectively, of an observer.

\* \* \* \* \*